(12) United States Patent
Woo

(10) Patent No.: US 10,789,591 B2
(45) Date of Patent: Sep. 29, 2020

(54) METHOD AND SYSTEM FOR AUTHENTICATING IOT DEVICE USING MOBILE DEVICE

(71) Applicant: ESTORM CO., LTD., Seoul (KR)

(72) Inventor: Jong Hyun Woo, Seoul (KR)

(73) Assignee: ESTORM CO., LTD., Seoul (KR)

( * ) Notice: Subject to any disclaimer, the term of this patent is extended or adjusted under 35 U.S.C. 154(b) by 343 days.

(21) Appl. No.: 15/801,518

(22) Filed: Nov. 2, 2017

(65) Prior Publication Data

US 2018/0121921 A1  May 3, 2018

Related U.S. Application Data

(63) Continuation-in-part of application No. PCT/KR2017/003740, filed on Apr. 5, 2017.

(30) Foreign Application Priority Data

Apr. 6, 2016  (KR) .................. 10-2016-0042552
Aug. 31, 2017  (KR) .................. 10-2017-0110558

(51) Int. Cl.
*G06Q 20/40* (2012.01)
*H04W 12/06* (2009.01)
*G06Q 20/32* (2012.01)
*H04L 29/06* (2006.01)
*G06Q 20/20* (2012.01)
(Continued)

(52) U.S. Cl.
CPC ....... *G06Q 20/4014* (2013.01); *G06Q 20/206* (2013.01); *G06Q 20/3223* (2013.01); *G06Q 20/3224* (2013.01); *G06Q 20/3278* (2013.01); *H04L 63/08* (2013.01); *H04L 63/0838* (2013.01); *H04L 67/12* (2013.01); *H04W 4/80* (2018.02); *H04W 12/06* (2013.01)

(58) Field of Classification Search
CPC ............ G06Q 20/4014; G06Q 20/206; G06Q 20/3223; G06Q 20/3224; G06Q 20/3278; H04W 4/80; H04W 12/06; H04L 63/08; H04L 63/0838; H04L 67/12
See application file for complete search history.

(56) References Cited

U.S. PATENT DOCUMENTS

| 8,495,372 | B2 * | 7/2013 | Bailey ................. H04L 63/0492 713/171 |
| 2018/0232514 | A1 * | 8/2018 | Brown .................. H04L 63/083 |
| 2019/0289003 | A1 * | 9/2019 | Setchell ................ H04W 12/06 |

* cited by examiner

*Primary Examiner* — Florian M Zeender
*Assistant Examiner* — Joseph M Mutschler
(74) *Attorney, Agent, or Firm* — Rabin & Berdo, P.C.

(57) ABSTRACT

Provided is an authentication system including: a device authentication agent installed in an Internet of things (IoT) device with a communication module and generating first device authentication information for authenticating the corresponding IoT device; an authentication server connected with the IoT device through wired or wireless communication and generating second device authentication information for authenticating the IoT device; and a mobile agent installed in a mobile device of a user, connected with the IoT device and the authentication server through the wireless communication, and verifying whether the IoT device or a message determined to be received from the IoT device is authentic according to whether the first device authentication information transmitted from the IoT device and the second device authentication information transmitted from the authentication server coincide with each other.

12 Claims, 17 Drawing Sheets

(51) Int. Cl.
*H04L 29/08* (2006.01)
*H04W 4/80* (2018.01)

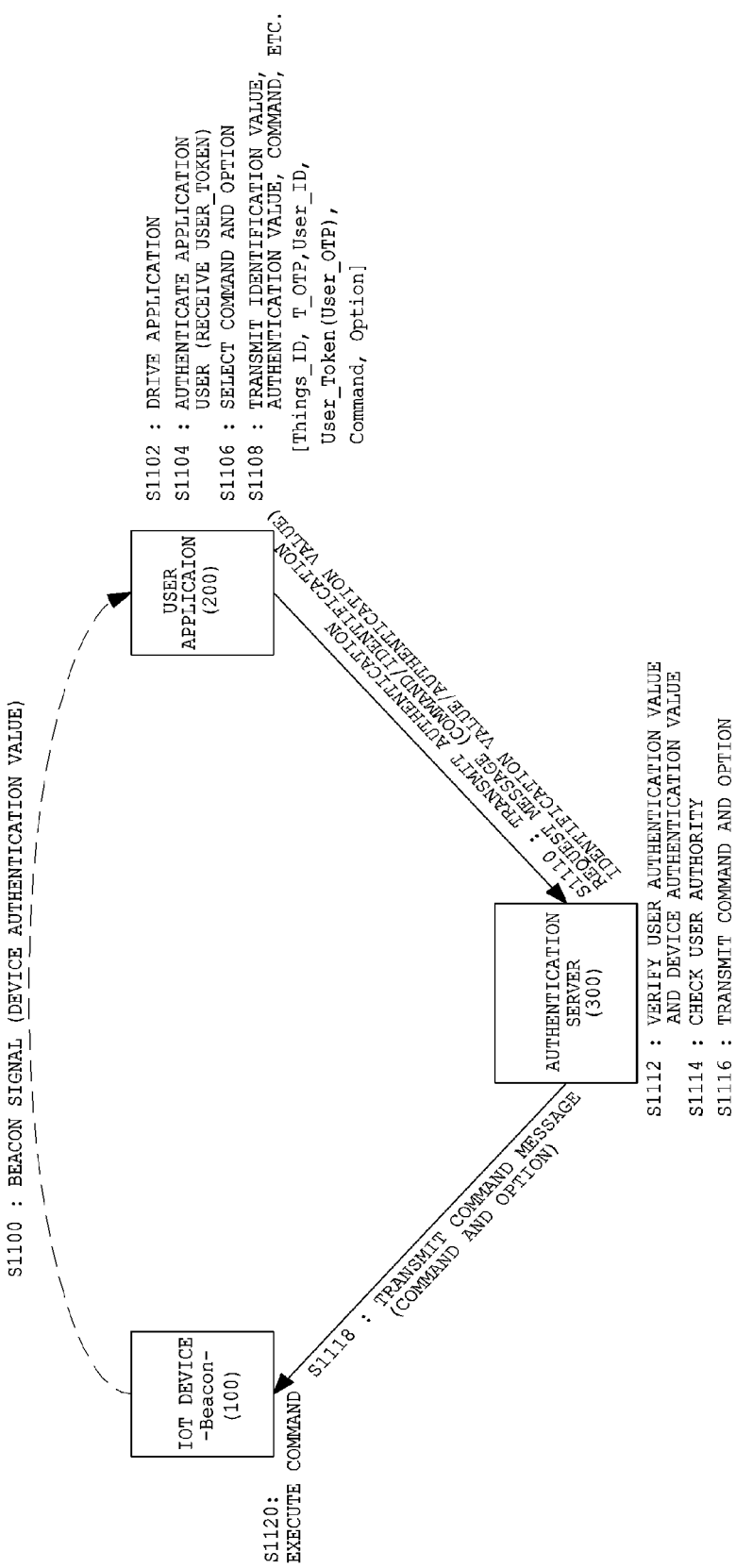

METHOD AND SYSTEM FOR AUTHENTICATING IOT DEVICE USING MOBILE DEVICE

CROSS-REFERENCE TO RELATED APPLICATIONS

This application is a continuation-in-part of International Application No. PCT/KR2017/003740 filed Apr. 5, 2017, which is based upon and claims the benefit of priority from Korean Patent Application Nos. 10-2016-0042552 filed Apr. 6, 2016, and 10-2017-0110558, filed Aug. 31, 2017 which are incorporated herein by reference in their entirety.

TECHNICAL FIELD

The present invention relates to a method and a system for authenticating an Internet of things (IoT) device using a mobile device.

BACKGROUND ART

In recent years, a technology becomes the spotlight, which allows a payment service to be safely and conveniently performed in a smart phone of a user by using the smart phone of a customer and an IoT device positioned at a store and a cloud service without using a card in when the customer performs a payment at the store.

The existing card transaction is executed by a method that generates transaction data by using a card reader and the card of the customer and transmits the transaction data to a card issue company when the customer presents the card at the store (card franchise) and thereafter, approves the action when there is no error in card information or transaction contents. This is a closed transaction approval structure in which card transaction information encrypted with an IC card of the customer is generated through a registered store card reader and the information is relayed to a card company through a safe closed network under the premise that the user is a correct card holder.

Further, while the mobile device such as the smart phone, etc., and a wireless data communication technology such as near-field communication (NFC) are joined with an EMV network tokenization specification established by an EMV, a mobile operator such as Apple Pay or Samsung Pay may perform the payment through the mobile device without a credit card by switching a card number which is temporarily issued in mobile to an actual card number.

However, since the card based transaction causes a card transaction fee in the store (franchise), various services have been developed, which may safely substitute for the payment with low cost between a person who needs to give money and a person who receives the money.

Nevertheless, substitution payment technologies in the related art as a QR code or barcode based payment technology based on a smart phone screen so as to be used in all customer smart phones regardless of a mobile operating system primarily include a method that concludes the traction by allowing a corresponding barcode value to be read a point of sales (POS) device at the store when the user generates a barcode in a screen for the transaction.

However, in the barcode based payment, a complicated code value recognition process between the customer and the store depending on the issue of the barcode is required and when the screen associated with the barcode issued by the mobile device is captured by a hacker, the barcode has a weakness in security, in which the barcode may be pirated at another place within a valid issue time.

Therefore, a payment technology is required, which enables the store to perform the payment service having security in addition to convenience by using the mobile device in the transaction with the customer. Further, as a technology which has been adopted in recent years, a new method is required, which enables safer mobile transaction and payment because authenticity of the IoT device may be authenticated in addition to the authenticity of the user in a transaction and payment system using the IoT device.

DISCLOSURE

Technical Problem

The present invention has been made in an effort to provide a method that can safely and conveniently perform a payment service by using a mobile device of a customer and an IoT device and a cloud service positioned at a store when the store and the customer perform a product transaction payment without using a card and a method and a system for authentication, which can verify both authenticity of a payment subject (customer) and the authenticity of a payment object (the IoT device as a payment device at the store) as a premise for a safe payment.

The present invention has also been made in an effort to provide a method and a system for authentication, which can be universally applied in various application fields in order to determine whether the IoT device is authentic by using the mobile device and an authentication server.

Technical Solution

An exemplary embodiment of the present invention provides an authentication system including: a device authentication agent installed in an Internet of things (IoT) device with a communication module and generating first device authentication information for authenticating the corresponding IoT device; an authentication server connected with the IoT device through wired or wireless communication and generating second device authentication information for authenticating the IoT device; and a mobile agent installed in a mobile device of a user, connected with the IoT device and the authentication server through the wireless communication, and verifying whether the IoT device or a message determined to be received from the IoT device is authentic according to whether the first device authentication information transmitted from the IoT device and the second device authentication information transmitted from the authentication server coincide with each other.

In the exemplary embodiment, the authentication server may generate seed information for generating device authentication information, transmit the seed information to the device authentication agent, and generate the second device authentication information by using the seed information and a predesignated algorithm, and the device authentication agent may generate the first device authentication information by using the seed information received from the authentication server and the predesignated algorithm.

In the exemplary embodiment, the device authentication agent may generate the seed information for generating the device authentication information, transmit the seed information to the authentication server, and generate the first device authentication information by using the seed information and the predesignated algorithm, and the authentication server may generate the second device authentication information by using the seed information received from the device authentication agent and the predesignated algorithm.

In the exemplary embodiment, the mobile agent may generate the seed information for generating the device authentication information and transmit the generated seed information to the authentication server, the authentication server may generate the second device authentication information by using the seed information received from the mobile agent and the predesignated algorithm and transmit the received seed information to the device authentication agent, and the device authentication agent may generate the first device authentication information by using the seed information received from the authentication server and the predesignated algorithm.

In the exemplary embodiment, the communication module may be a beacon communication module, and the device authentication agent may insert identification information usable for identifying the corresponding IoT device and the first device authentication information into a beacon message and wirelessly broadcast the beacon message.

Herein, the first device authentication information may be inserted into at least one of a major field and a minor field which follow a data field area in which a UUID as a beacon unique value is inserted into the beacon message.

Further, herein, when the first device authentication information exceeds the size of the data field area into which the first device authentication information is to be inserted, the first device authentication information may be converted into a value which does not exceed the size of the corresponding data field area and inserted into the beacon message.

In the exemplary embodiment, the communication module may be a near-field communication (NFC) communication module, and the device authentication agent may transmit the first device authentication information to the mobile agent as a communication session with the mobile agent is activated through NFC handshake.

In the exemplary embodiment, when the first device authentication information and the second device authentication information are generated by a time one time password (OTP) method using a time as an operation condition, the authentication server may transmit both this-time second device authentication information generated at this time and previous-time second device authentication information generated at the previous time to the mobile agent, and the mobile agent may determine whether the first device authentication information coincides with any one of the this-time second device authentication information and the previous-time second device authentication information to verify whether the IoT device is authentic.

In the exemplary embodiment, the device authentication agent may transmit the first device authentication information to the authentication server, and the authentication server may reverify whether the IoT device is authentic according to whether the first device authentication information received from the device authentication agent and autonomously generated second device authentication information coincide with each other.

In the exemplary embodiment, the mobile agent may generate first user authentication information for authenticating a user according to the predesignated algorithm and transmits user identification information usable for identifying the corresponding user and the first user authentication information to the authentication server, and the authentication server may autonomously generate second user authentication information according to the predesignated algorithm to correspond to the user identification information received from the mobile agent, verify whether the corresponding user is authentic according to whether the received first user authentication information and the autonomously generated second user authentication information coincide with each other, and transmit a verification result regarding whether the corresponding user is authentic to the device authentication agent.

In the exemplary embodiment, the authentication server may generate first server verification information by using the user authentication information for the user authentication and a predesignated algorithm and transmit the first server verification information and the user authentication information to the device authentication agent, and the device authentication agent may generate second server verification information by using the user authentication information received from the authentication server and the predesignated algorithm and verify whether the authentication server is authentic according to whether the first server verification information received from the authentication server and the second server verification information coincide with each other.

Another exemplary embodiment of the present invention provides an authentication system including: a mobile agent installed in a mobile device of a user, generating seed information for generating authentication information to be used mutual authentication between devices, and generating first authentication information by using the seed information and a predesignated algorithm, as an authentication application program performing a predesignated authentication procedure is driven; a device authentication agent installed in an Internet of things (IoT) device with a communication module, connected with the mobile agent through wireless communication, receiving the seed information from the mobile agent, and generating second authentication information by using the received seed information and the predesignated algorithm; and an authentication server connected with the mobile agent through the wireless communication, connected with the IoT device through wired communication or the wireless communication, generating third authentication information by using the received seed information and the predesignated algorithm when receiving the seed information and the first authentication information from the mobile agent, receiving the second authentication information from the device authentication agent, and duplicatively verifying whether the received first authentication information and the third authentication information coincide with each other and whether the received second authentication information and the third authentication information coincide with each other.

Yet another exemplary embodiment of the present invention provides an authentication system including: a device authentication agent installed in an Internet of things (IoT) device with a communication module and acquiring first device authentication information for authenticating the corresponding IoT device; a mobile agent installed on a mobile device of a user, acquiring user authentication information for authenticating the user, and generating an authentication request message including the device authentication information received from the device authentication agent and the user authentication information; and an authentication server generating authentication information for verification corresponding to each of the device authentication information and the user authentication information included in the authentication request message to compare coincidence of the authentication information for verification and determining whether the IoT device and the user are authentic.

In the exemplary embodiment, the communication module may be a beacon communication module, and the device authentication agent may insert identification information usable for identifying the corresponding IoT device and the device authentication information into a beacon message and wirelessly broadcast the beacon message.

In the exemplary embodiment, the device authentication information may be inserted into at least one of a major field and a minor field which follow a data field area in which a UUID as a beacon unique value is inserted into the beacon message.

In this case, when the device authentication information exceeds the size of the field area to be inserted, the device authentication information may be converted into a value which does not exceed the size of the field area to be inserted and inserted into the beacon message.

In the exemplary embodiment, the mobile agent may perform authentication for an application user by driving an application executing a specific application service, and transmit to the authentication server the authentication request message which includes at least the device authentication information and further includes at least one of the user authentication information, the user identification information, and the device identification information, when the device identification information and the device authentication information are received through the beacon message.

In the exemplary embodiment, the mobile agent may transmit to the authentication server the authentication request message only when it is determined that a distance between the IoT device and the mobile device is within a predetermined distance based on reception intensity or sensitivity of the beacon message.

In the exemplary embodiment, the mobile agent may replace and use a user token acquired when the application user authentication is completed as the user authentication information or use a user authentication value generated newly according to the reception of the device authentication information as the user authentication information.

In the exemplary embodiment, the mobile agent may transmit to the authentication server an execution command selected by the application user included in the authentication request message in relation to the application service executed through the application.

In the exemplary embodiment, the authentication server may generate the authentication information for verification corresponding to each of the device authentication information and the user authentication information when the authentication request message is received and generate a command message for processing the execution command included in the authentication request message to be executed when the authentication information for verification, the device authentication information and the user authentication information coincide with each other.

In the exemplary embodiment, the authentication server may check whether authority corresponding to the execution command is granted to the authenticated user when the authentication information is completed through the authentication information for verification and determine generation of the command message according to the authority checked result.

Advantageous Effects

According to exemplary embodiments of the present invention, a safe and convenient payment service can be performed in all mobile devices supporting NFC or Beacon by using the mobile device of a customer and an IoT device and a cloud service positioned at a store when the store and a customer perform a payment without using a card. Further, according to the exemplary embodiments of the present invention, a method and a system for authentication can be provided, which can verify both authenticity of a payment subject (customer) and the authenticity of a payment object (the IoT device as a payment device at the store) as a premise for a safe payment.

According to the exemplary embodiments of the present invention, a method and a system for authentication can be provided, which can be universally applied in various application fields in order to determine whether the IoT device is authentic by using the mobile device and an authentication server.

DESCRIPTION OF DRAWINGS

FIG. 17 is a diagram of an exemplary embodiment for describing a method and a system for authentication capable of simultaneously authenticating a user and an IoT device by using an IoT device having a beacon message transmission function and mobile applications which are installed on a mobile device.

BEST MODE

Figure 1:
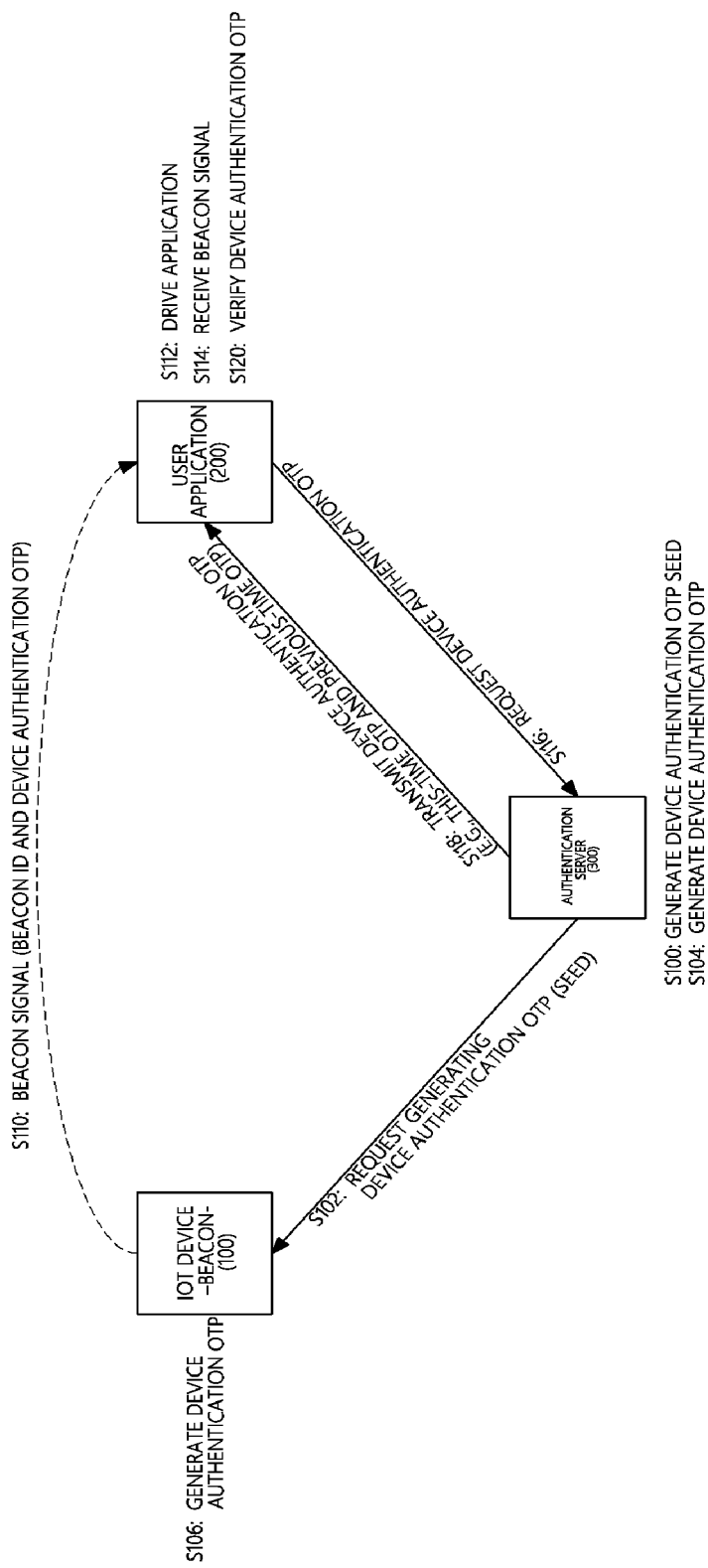
FIG. 1 is a diagram of a first exemplary embodiment for describing a method and a system for authentication in a mobile payment system when an IoT device having a beacon message transmission function is installed at a store.

The present invention may have various modifications and various embodiments and specific exemplary embodiments will be illustrated in the drawings and described in detail in the detailed description. However, this does not limit the present invention to specific embodiments, and it should be understood that the present invention covers all the modifications, equivalents and replacements included within the idea and technical scope of the present invention.

In describing the embodiment of the present disclosure, a detailed description of related known technologies will be omitted if it is determined that they unnecessarily make the gist of the present disclosure unclear. In addition, numeral figures (for example, 1, 2, and the like) used during describing the specification are just identification symbols for distinguishing one element from another element.

Further, throughout the specification, if it is described that one component is "connected" or "accesses" the other component, it is understood that the one component may be directly connected to or may directly access the other component but unless explicitly described to the contrary, another component may be "connected" or "access" between the components.

Further, throughout the specification, unless explicitly described to the contrary, the word "comprise" and variations such as "comprises" or "comprising", will be understood to imply the inclusion of stated elements but not the exclusion of any other elements. In addition, terms including "part", "unit", "module", and the like disclosed in the specification mean a unit that processes at least one function or operation and means that this may be implemented by one or more hardware or software or a combination of the hardware and software. Further, Push ID expressed by general mobile application developers means Push Token and a push message service means a message service provided for each application in a mobile operating system such as Google or Apple.

In the present specification, each exemplary embodiment of the present invention is described by primarily using a mobile payment or mobile commercial transaction case, but hereinafter, it is first clarified that a method and a system for authentication to be described through each drawing may be universally applied in various application fields in order to determine whether various IoT devices are authentic by using a mobile device and an authentication server.

However, when it is assumed that the present invention is applied to the mobile payment or commercial transaction case, an 'IoT device 100' may be a device that is installed at a store and performs various operations (e.g., a transaction approval request, etc.) associated with a mobile payment or transaction through communication with a mobile device (e.g., a smart phone) of a customer, in the present specification and each drawing. Herein, the IoT device 100 may be a separate independent device which communication-interlocks with a point of sales (POS) terminal and may be substituted with the POS terminal or implemented by a device integrated with the POS terminal. Further, herein, hardware or/and software may be installed in the IoT device 100 so as to implement a Beacon function or a near-field communication (NFC) function. From such a viewpoint, when it is assumed that the present invention is applied to the mobile payment or commercial transaction case, a 'user application 200' is installed in the mobile device such as the smart phone possessed by the customer, etc., in the present specification and each drawing to indicate an application program (that is, referred to as a mobile agent in the present invention) performing a series of operations to be described below. Further, in the present invention, it is described that the IoT device 100 itself performs a role in each drawing for easy description, but a software program or a hardware module (referred to as a device authentication agent in the present invention) that performs the corresponding role is actually installed or mounted in the IoT device to perform the role according to each exemplary embodiment of the present invention, of course.

In addition, in the present specification, it is first clarified that authentication of the IoT device is a concept including even a case of verifying whether a message determined to be received from the corresponding IoT device is a message which is forged as a device ID, etc., is pirated by a hacker, etc., as well as authenticating whether the IoT device itself is authentic.

Further, it is clarified that reference numerals (that is, S100, S102, S104, etc.) associated with respective steps in flowcharts of FIGS. 1 to 15 to be described below are just used for distinguishing describing the respective steps and do not define a procedural order. Logically, unless other steps may be executed only after any one step is executed, the respective steps may be executed in parallel or simultaneously regardless of the order of the reference numerals, of course. In some cases, it is apparent that the respective steps may be executed in an order different from the order of the reference numerals. Only when a core technical feature of the present invention may be sufficiently reflected, the order of the respective steps may also be variously modified. However, hereinafter, for intensive and easy description, the respective steps will be described according to the order illustrated in the drawing.

As another example, when it is assumed that the present invention is applied to a door control case, in the present specification and the drawings, an 'IoT device' 100 may be a device which is installed on a door and performs various operations associated with opening and closing of the door (alternatively, an entrance log) through communication with a customer's mobile device. In this case, the IoT device 100 may also be an entrance control terminal itself, but may be a separate independent device from the entrance control terminal and may also be replaced with the entrance control terminal or implemented as an integrated device with the entrance control terminal.

Hereinafter, respective exemplary embodiments of the present invention will be described in detail with reference to the accompanying drawings.

FIG. 1 is a diagram of a first exemplary embodiment for describing a method and a system for authentication in a mobile payment system when an IoT device having a beacon message transmission function is installed at a store.

Referring to FIG. 1, a system is disclosed, which includes an IoT device 100 positioned at the store, a user application 200 installed in a mobile device of a customer, and an authentication server 300. In this case, the IoT device 100 and the user application 200 may be connected to each other and the user application 200 and the authentication server 300 may be connected to each other through wireless communication and the IoT device 100 and the authentication server 300 may be connected through wired communication or the wireless communication. In this case, it is assumed that the IoT device 100 has the beacon message transmission function (applied even to FIGS. 2 to 6).

Hereinafter, an authentication flowchart of FIG. 1 will be described. FIG. 1 illustrates a process of authenticating the IoT device positioned at the store as a premise for a mobile payment.

The authentication server 300 generates a device authentication OTP seed as seed information for authenticating the IoT device [see S100 of FIG. 1] and requests the IoT device 100 to generate a device authentication OTP while transmitting the generated seed to the IoT device 100 [see S102 of FIG. 1]. Further, the authentication server 300 autonomously generates the device authentication OTP by using the generated seed [see S104 of FIG. 1]. The IoT device 100 generates the device authentication OTP based on the received seed according to the device authentication OTP generation request [see S106 of FIG. 1].

In this case, the authentication server 300 and the IoT device 100 may share a generation condition, a generation method, or a generation algorithm of the device authentication OTP which is common in advance. In general, the OTP generation method includes a time OTP method and a challenge and response method. Herein, the time OTP method is a method that generates the OTP by using a generation time as an operation condition. By the method, a value acquired by multiplying a determined specific OTP generation key by the generation time as the operation condition may be generated as a value encrypted according to a specific hash function. In addition, the challenge and response method is a method that generates the OTP by using the number of attempts as the operation condition. By the method, a value acquired by multiplying the determined specific OTP generation key by the number of attempt times as the operation condition may be generated as the value encrypted according to the specific hash function. Therefore, by the time OTP method, a new OTP value is generated whenever a valid time (e.g., 60 seconds) of the corresponding OTP value elapses. On the contrary, by the challenge and response method, when the number of attempt times is identical, the same OTP value will be maintained regardless of the time.

Further, in this case, the authentication server 300 and the IoT device 100 may share some among key values for generating the OTP with each other in advance. For example, when the device authentication OTP is generated, an ID (that is, an IoT ID) of the corresponding IoT device or a key value of the IoT device may be shared with each other in advance. Therefore, the authentication server 300 may transmit a key value (e.g., a random number which is a variable value, etc.) other than the shared key value or/and the operation condition (e.g., an attempt value (challenge value) when the challenge and response method is used) to the IoT device 100 as the seed.

Due to the reason, the device authentication OTPs generated in S104 and S106 of FIG. 1 will be the same value.

As a result, the IoT device 100 loads a beacon ID and the device authentication OTP generated in S106 of FIG. 1 on a beacon message and wirelessly transmits (broadcasts) the beacon message [see S110 of FIG. 1]. In this case, the beacon ID is information for identifying the IoT device that transmits a beacon signal and the device authentication OTP is information used for determining authenticity of the corresponding IoT device.

In general, according to an operation method, the beacon is operated so as to read a major field value and a minor field value of the beacon of a corresponding UUID only when a UUIC value which coincides with the UUIC value of the beacon is loaded on the beacon message (in the case of iOS) or operated by a method that filters and uses only the UUID among all beacon UUIDs received at a beacon frequency (in the case of android OS). Further, in general, in the beacon, at least one of unique UUIDs for identifying the service provided according to the corresponding beacon is selected and used as a service unique value and the major/minor field is used as a building name or a designated location. However, in the case where at least one UUID value or the major/minor field is used as described above, when a beacon value is read by a beacon scanner, the beacon that generates the same beacon value is generated as if the beacon exists on the spot and the generated beacon is read through a mobile application, a situation may be fabricated as if even a user who does not visit the corresponding beacon location visits the corresponding location. The reason is that since an opened frequency is used in the beacon, when the beacon is scanned by a general mobile device, the scanned beacon value may be read. Therefore, in order to use the beacon in a more delicate area such as a financial transaction or verification of the visitation location or check of visitation equipment (a vehicle, a robot, etc.), it should be able to be proved that the beacon frequency has not been fabricated by a secondary provider.

In order to solve the problem, in the exemplary embodiment, in the case where one or 20 beacon UUID values or less are recommended to be used in the same service, the UUID is used as a unique service identifier and the UUID may be used by configuring the major field by an equipment identifier (that is, the beacon ID) and the minor field by an authentication value (that is, the device authentication OTP).

In this case, in the beacon message, the length of a usable data field varies for each of beacon methods (e.g., iBeacon, Eddystone, etc.), but in general, information which may be transferred is limitative unlike NFC, and as a result, as a method that inserts a device authentication value into the beacon message, the following method may be used. In the following description, a case where the major field is constituted by 2 bytes and the minor field is constituted by 2 bytes on the beacon message is assumed and described.

According to a system configuration, if one equipment is provided in one service, the entirety of 4 bytes of the major and minor fields next to one UUID may be used as the device authentication value, but if multiple equipments need to be authenticated in the same service, the major field of 2 bytes may be used as the equipment identification value and the minor field of 2 bytes used as the device authentication value next to one service UUID.

In this case, when the entirety of 4 bytes is constituted by a hexa string, the device authentication value may be expressed by 65536 and when only the minor field of 2 bytes is used for inserting the device authentication value, the device authentication value may be expressed by 65536 which is 16 square of 2 when 2 bytes are expressed by bits. Further, in some cases, when the generated device authentication value is more than 65536, the device authentication value may be processed to be converted into a value which is not more than 65536 or when the device authentication value is generated, the device authentication value may be processed to be generated as an authentication value which is equal to or less than 65536. In this case, when the number of used beacons is more than 65000 according to a service configuration, a maximum of 20 UUID values are additionally set to increase the number of beacons.

A signal strength of the beacon signal transmitted in S110 of FIG. 1 may be controlled so that the beacon signal is driven with low power and effectually detected by another device only within a specific location range. Hereinafter, it is assumed that the signal strength of the beacon signal transmitted in S110 of FIG. 1 is controlled so that the beacon signal is effectually detected only at the store at which the corresponding IoT device is installed.

As a result, when the user application 200 installed in the mobile device possessed by the user (customer) who enters the corresponding store is driven [see S112 of FIG. 1], the IoT device 100 may receive the beacon signal transmitted at the corresponding time [see S114 of FIG. 1]. In FIG. 1, a case where the customer directly drives the application is illustrated, but as the customer receives the beacon signal by entering a predetermined location range, the application may be implemented to be automatically driven.

When the beacon signal transmitted by the IoT device 100 is received, the user application 200 requests the authentication server 300 to transmit the device authentication OTP in order to determine the authenticity of the corresponding IoT device [see S116 of FIG. 1]. As a result, the authentication server 300 may transmit the autonomously generated device authentication OTP to the user application 200 [see S118 of FIG. 1].

In this case, when the generated device authentication OTP is a value generated by the time OTP method, the device authentication OTP value received by the user application 200 according to S110 of FIG. 1 and the device authentication OTP value received by the user application 200 according to S118 of FIG. 1 may be different from each other. Since the OTP value at the previous time and the OTP value at this time which have different valid time in some cases may be received, a receiving time of the device authentication OTP value in the user application 200 according to S110 of FIG. 1 and the receiving time of the device authentication OTP value in the user application 200 according to S118 of FIG. 1 are different from each other. Therefore, by considering such a case, the authentication server 300 may transmit both the device authentication OTP (that is, the previous-time OTP) generated at the previous time in S118 of FIG. 1 and the device authentication OTP (that is, the this-time OTP) which is currently generated to the user application 200.

As a result, the user application 200 checks whether the device authentication OTP value loaded in the beacon message received from the IoT device 100 through S110 of FIG. 1 and the device authentication OTP value received from the authentication server 300 through S118 of FIG. 1 coincide with each other to verify whether the IoT device 100 transmitting the beacon message is an authentic device performing the transaction at the store (that is, whether the IoT device is authentic or forgery) through a checking result [see S120 of FIG. 1].

Figure 2:
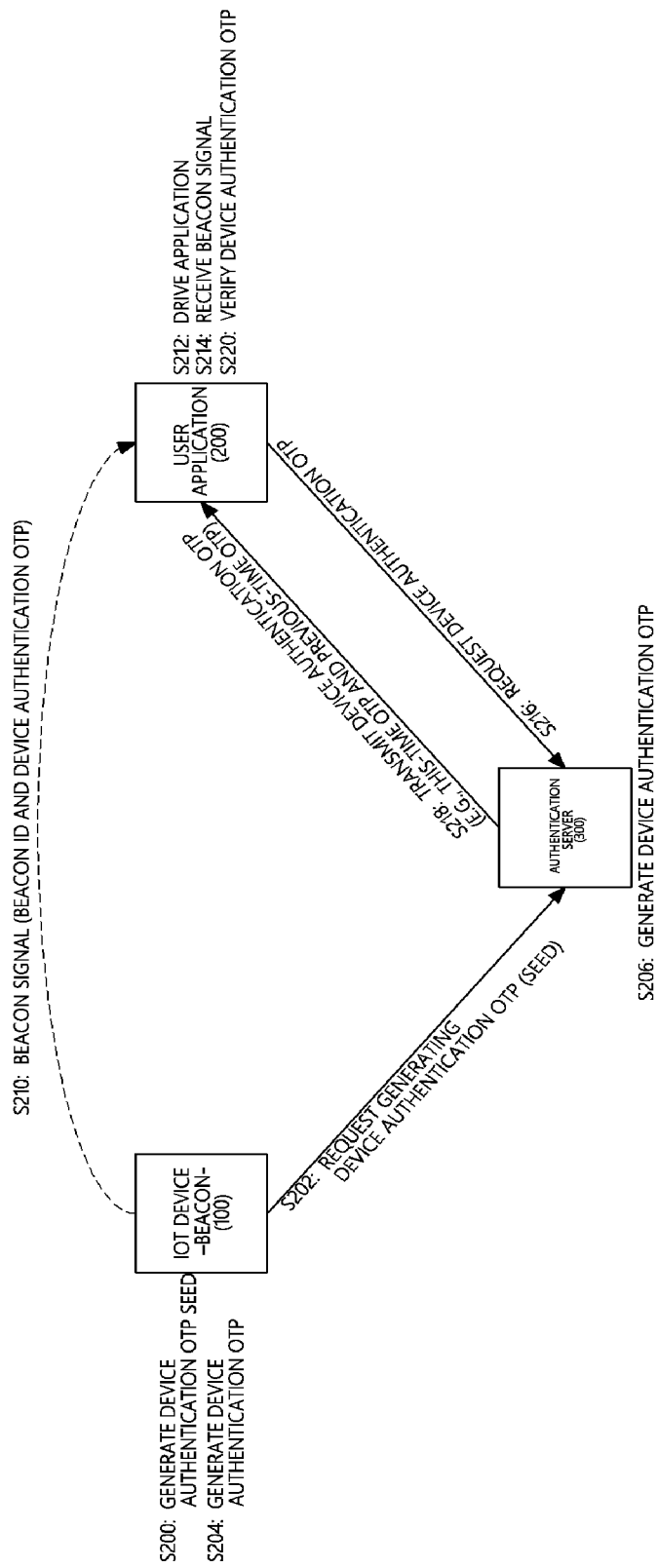
FIG. 2 is a diagram of a second exemplary embodiment for describing a method and a system for authentication in a mobile payment system when an IoT device having a beacon message transmission function is installed at a store.

FIG. 2 is a diagram of a second exemplary embodiment for describing a method and a system for authentication in a mobile payment system when an IoT device having a beacon message transmission function is installed at a store. Hereinafter, the authentication flowchart of FIG. 2 will be described. FIG. 2 also illustrates a process of authenticating the IoT device positioned at the store as the premise for the mobile payment. During a process of describing FIG. 2, a duplicated description of steps having the same concept as FIG. 1 with the above description is omitted.

There is a core difference between FIGS. 1 and 2 in that the seed information of the device authentication OTP is generated by the authentication server 300 and transferred to the IoT device 100 in FIG. 1, but the seed information of the device authentication OTP for determining whether the IoT device 100 is authentic is autonomously generated by the IoT device 100 in FIG. 2.

That is, the IoT device 100 generates the seed for generating an initial device authentication OTP [see S200 of FIG. 2] and requests transmitting the device authentication OTP while transmitting the generated seed to the authentication server 300 [see S202 of FIG. 2]. In this case, the IoT device 100 autonomously generates the device authentication OTP by using the generated seed [see S204 of FIG. 2] and the authentication server 300 also generates the device authentication OTP by using received seed [see S206 of FIG. 2].

As a result, the IoT device 100 loads the beacon ID and the device authentication OTP generated in S204 of FIG. 2 on the beacon message and wirelessly transmits (broadcasts) the beacon message to the outside [see S210 of FIG. 2]. In this case, it is also described above that the beacon ID is the information for identifying the IoT device that transmits the beacon signal and the device authentication OTP is the information used for determining the authenticity of the corresponding IoT device. Further, a method that inserts the device authentication OTP into a data field may also be described similarly to the above description. In addition, it is similarly assumed that the signal strength of the beacon signal transmitted in S210 of FIG. 2 is controlled so that the beacon signal is effectually detected only at the store at which the corresponding IoT device is installed.

As a result, when the user application 200 installed in the mobile device possessed by the user (customer) who enters the corresponding store is driven [see S212 of FIG. 2], the IoT device 100 may receive the beacon signal transmitted at the corresponding time [see S214 of FIG. 2].

When the beacon signal transmitted by the IoT device 100 is received, the user application 200 requests the authentication server 300 to transmit the device authentication OTP in order to determine the authenticity of the corresponding IoT device [see S216 of FIG. 2]. As a result, the authentication server 300 may transmit the autonomously generated device authentication OTP to the user application 200 [see S218 of FIG. 2]. Although described above, when the device authentication OTP is the value generated by the time OTP method, the authentication server 300 may transmit both the device authentication OTP (that is, the previous-time OTP) generated at the previous time in S218 of FIG. 2 and the device authentication OTP (that is, the this-time OTP) which is currently generated to the user application 200.

As a result, the user application 200 checks whether the device authentication OTP value loaded in the beacon message received from the IoT device 100 through S210 of FIG. 2 and the device authentication OTP value received from the authentication server 300 through S218 of FIG. 2 coincide with each other to verify whether the IoT device 100 transmitting the beacon message is authentic or forgery through the checking result [see S220 of FIG. 2].

Figure 3:
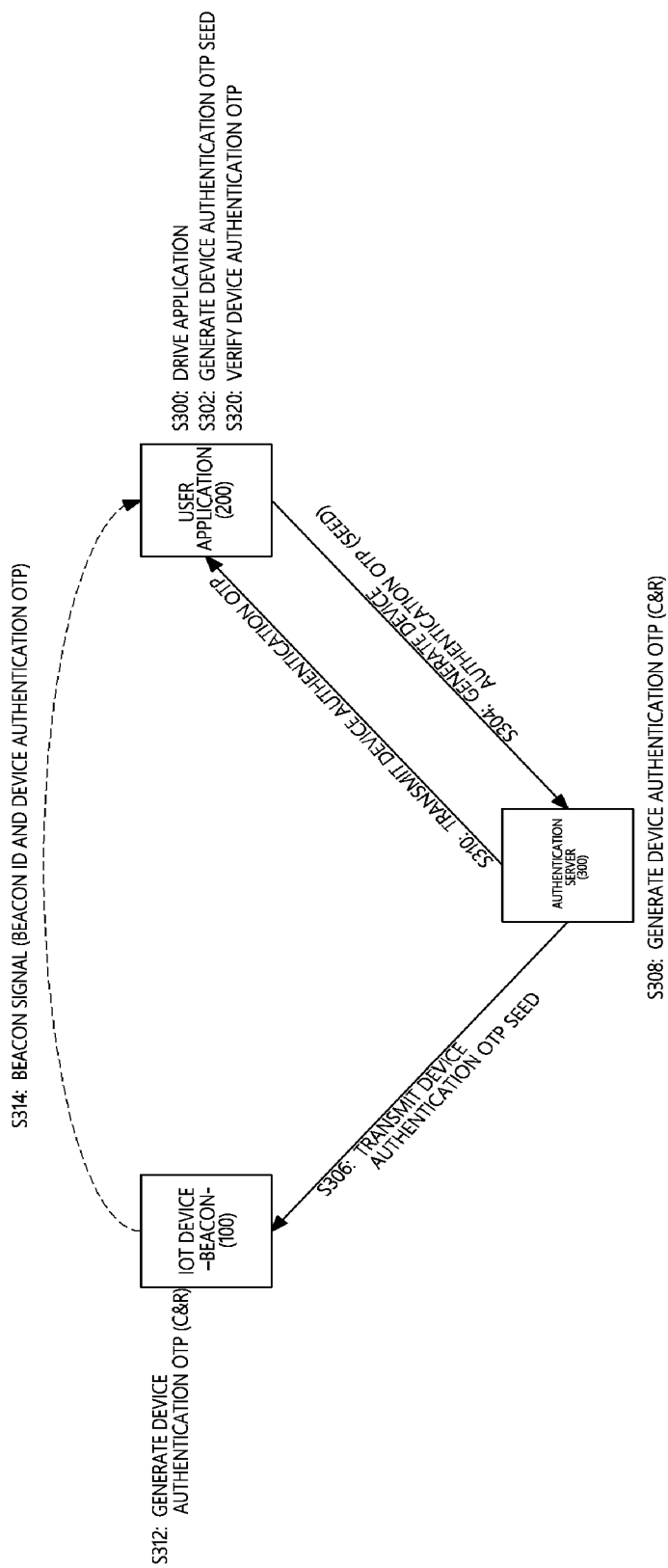
FIG. 3 is a diagram of a third exemplary embodiment for describing a method and a system for authentication in a mobile payment system when an IoT device having a beacon message transmission function is installed at a store.

FIG. 3 is a diagram of a third exemplary embodiment for describing a method and a system for authentication in a mobile payment system when an IoT device having a beacon message transmission function is installed at a store. Hereinafter, the authentication flowchart of FIG. 3 will be described. FIG. 3 also illustrates the process of authenticating the IoT device positioned at the store as the premise for the mobile payment. During the process of describing FIG. 3, the duplicated description of the steps having the same concept as the description in the above drawings is omitted.

In that in FIG. 1 give above, the method that generates the seed information of the device authentication OTP to the authentication server 300 and transfers the generated seed information to the IoT device 100 is provided and in FIG. 2, the method in which the IoT device 100 autonomously generates the seed information of the device authentication OTP for determining whether the IoT device 100 is authentic is provided, while in FIG. 3, the method that the seed information to generate the device authentication OTP is generated and transferred in the user application 200 or the method that requests generating the initial device authentication OTP in the user application 200 is provided, there is the core difference between FIG. 3 and FIGS. 1 and 2 given above.

For example, as the user who enters the store drives the user application 200 installed in the mobile device possessed by the user [see S300 of FIG. 3], the user application 200 generates a device authentication OTP seed [see S302 of FIG. 3] and requests generating the device authentication OTP while transmitting the generated seed to the authentication server 300 [see S304 of FIG. 3]. Of course, according to a system design method, such a process may be executed while the beacon signal which the IoT device 100 continuously broadcasts is received and the user application 200 is automatically driven.

When the seed is received from the user application 200, the authentication server 300 may transmit the corresponding seed to the IoT device 100 [see S306 of FIG. 3], generate the device authentication OTP by using the corresponding seed [see S308 of FIG. 3], and transmit the generated device authentication OTP to the user application 200 [see S310 of FIG. 3]. Further, the IoT device 100 may generate the device authentication OTP by using the received seed. Herein, the authentication server 300 and the IoT device 100 may share the generation method of the device authentication OTP, etc., with each other in advance as described above.

The IoT device 100 loads the beacon ID and the device authentication OTP generated in S312 of FIG. 3 on the beacon message and wirelessly transmits (broadcasts) the beacon message to the outside [see S314 of FIG. 3]. As a result, the user application 200 compares whether the device authentication OTP received in S310 of FIG. 3 and the device authentication OTP received in S314 of FIG. 3 coincide with each other to verify whether the IoT device 100 transmitting the beacon message is authentic or forgery [see S316 of FIG. 3].

A case where the user application 200 transmits the seed to generate the device authentication OTP to the authentication server 300 and the authentication server 300 transmits the corresponding seed to the IoT device 100 again is primarily described hereinabove, but the case may exist as another modified example. For example, the user application 200 may request the authentication server 300 to generate the device authentication OTP through step S304 of FIG. 3 without separately generating the seed. In this case, the authentication server 300 uses the key value used when the authentication server 300 generates the device authentication OTP or the operation condition as the seed to transmit the key value or the operation condition to the IoT device 100 through step S306 of FIG. 3. As one example, when the authentication server 300 generates the device authentication OTP by the challenge and response method, the authentication server 300 may transmit the challenge value which is the operation condition to the IoT device 100 as the seed.

Figure 4:
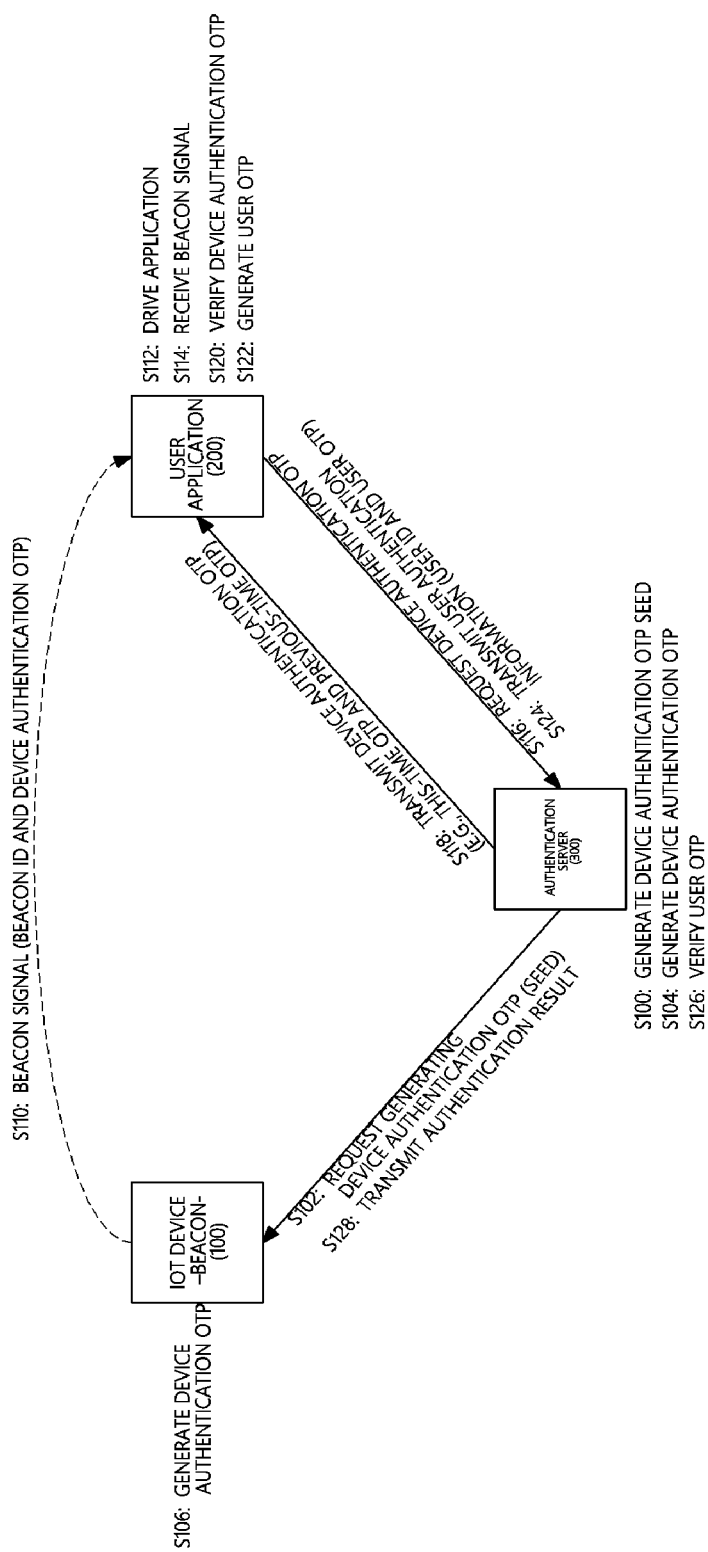
FIG. 4 is a diagram of a fourth exemplary embodiment for describing a method and a system for authentication in a mobile payment system when an IoT device having a beacon message transmission function is installed at a store.

FIG. 4 is a diagram of a fourth exemplary embodiment for describing a method and a system for authentication in a mobile payment system when an IoT device having a beacon message transmission function is installed at a store.

Herein, FIG. 4 is an authentication flowchart in which the user side (that is, the user application 200) verifies the IoT device 100 and thereafter, the authentication server 300 verifies the user side. As a result, steps S100 to S120 of FIG. 4 are the same as described above in FIG. 1. When a process is completed, in which the user side verifies the IoT device according to steps S100 to S120 of FIG. 4, a process is executed, in which the authentication server according to steps S122 to S218 of FIG. 4 verifies the user side.

When verifying the IoT device is completed, the user application 200 generates an authentication value (that is, as a value for proving that the user is an authentic user, in this example, a user OTP) for authenticating the user [see S122 of FIG. 4] and transmits user authentication information to the authentication server 300 [see S124 of FIG. 4]. In this case, identification information (a user ID in this example) to identify the corresponding user and the user OTP may be transmitted to the authentication server 300 as the user authentication information. Herein, as user identification information, a mobile device identification value, a mobile device phone number, a USIM value, an application ID, etc., may be used in addition to the user ID in this example.

As a result, the authentication server 300 identifies the corresponding user that transmits the user OTP, autonomously generates the user OTP according to the OTP generation method or/and the operation condition which is/are shared in advance, and compares whether the autonomously generated user OTP and the received user OTP coincide with each other to verify whether the user side is authentic or forgery [see S126 of FIG. 4]. Thereafter, the authentication server 300 may transmit a user authentication result according to S126 of FIG. 4 to the IoT device 100 [see S128 of FIG. 4].

Figure 5:
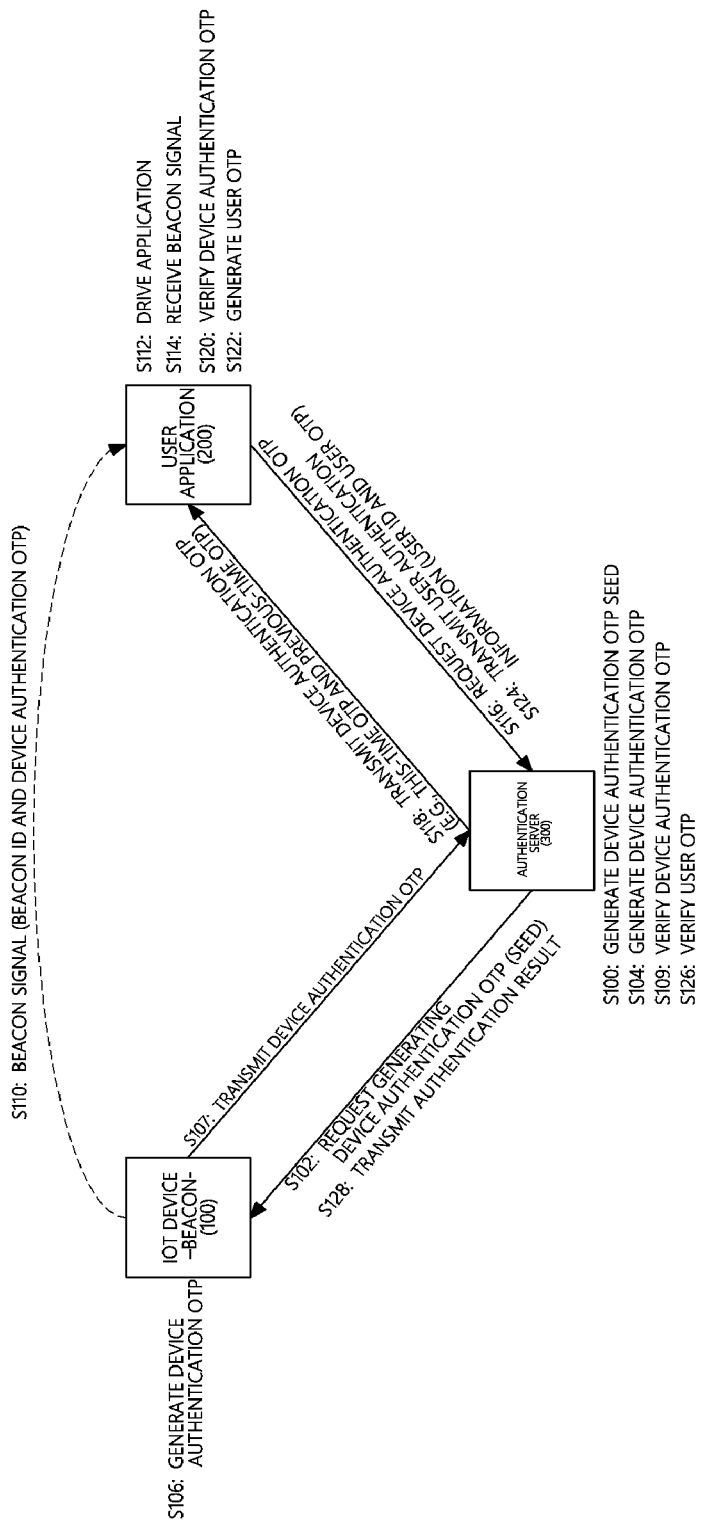
FIG. 5 is a diagram of a fifth exemplary embodiment for describing a method and a system for authentication in a mobile payment system when an IoT device having a beacon message transmission function is installed at a store.

FIG. 5 is a diagram of a fifth exemplary embodiment for describing a method and a system for authentication in a mobile payment system when an IoT device having a beacon message transmission function is installed at a store.

Herein, in FIG. 5, an IoT device authentication process according to steps S107 to S109 of FIG. 5 is added to the authentication flowchart of FIG. 4, which is described above. That is, according to FIGS. 1 and 4, the IoT device is authenticated by the user side (that is, the user application 200), but the IoT device is concurrently authenticated even by the authentication server 300 in FIG. 5 to authenticate the IoT device with higher reliability. That is, in step S106 of FIG. 5, the device authentication OTP which the IoT device 100 autonomously generates is transmitted even to the authentication server 300 [see S107 of FIG. 5], and as a result, the authentication server 300 compares whether the device authentication OTP autonomously generated in step S104 of FIG. 5 and the device authentication OTP received from the IoT device 100 coincide with each other to reverify whether the IoT device is authentic or forgery.

Figure 6:
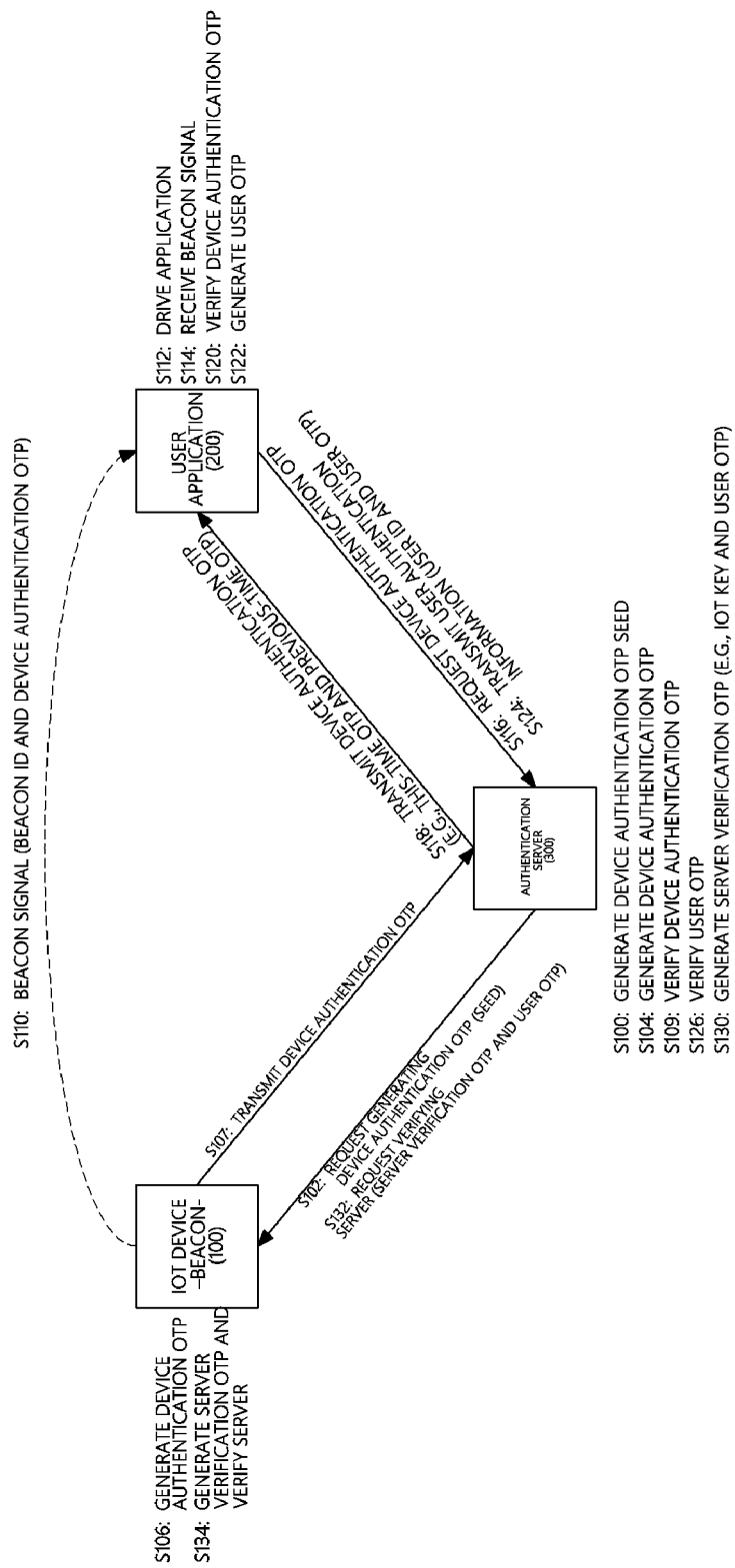
FIG. 6 is a diagram of a sixth exemplary embodiment for describing a method and a system for authentication in a mobile payment system when an IoT device having a beacon message transmission function is installed at a store.

FIG. 6 is a diagram of a sixth exemplary embodiment for describing a method and a system for authentication in a mobile payment system when an IoT device having a beacon message transmission function is installed at a store.

Herein, S100 to S126 of FIG. 6 are performed by the same procedure as FIG. 5 given above. In addition, in FIG. 6, there is a technical feature that the authentication of the authentication server 300 is also performed together with the authentication of the IoT device and the authentication process at the user side. The authentication of the authentication server 300 may be performed through S130, S132, and S134 of FIG. 6.

That is, when the authentication (concurrent authentication at the user side and the authentication server side) of the IoT device and the authentication of the user side through steps S100 to S126 of FIG. 6 are completed, the authentication server 300 may generate the authentication value (a server verification OTP in this example) for proving that the authentication server 300 is an authentic authentication server (that is, not the forgery authentication server) [see S130 of FIG. 6]. In this case, a server authentication value may be generated by various methods, of course, but in this example, a server verification OTP is generated by using an IoT key value shared with the IoT device and the user OTP.

Thereafter, the authentication server 300 may request server verification while transmitting the generated server verification OTP and user OTP to the IoT device 100 [see S132 of FIG. 6]. In this case, the IoT device 100 generates the server verification OTP by using the IoT key value thereof and the received user OTP and compares whether the autonomously generated server verification OTP and the server verification OTP received from the authentication server 300 coincide with each other to verify whether the authentication server 300 which communicates with the IoT device 100 is authentic [see S134 of FIG. 6].

Figure 16:
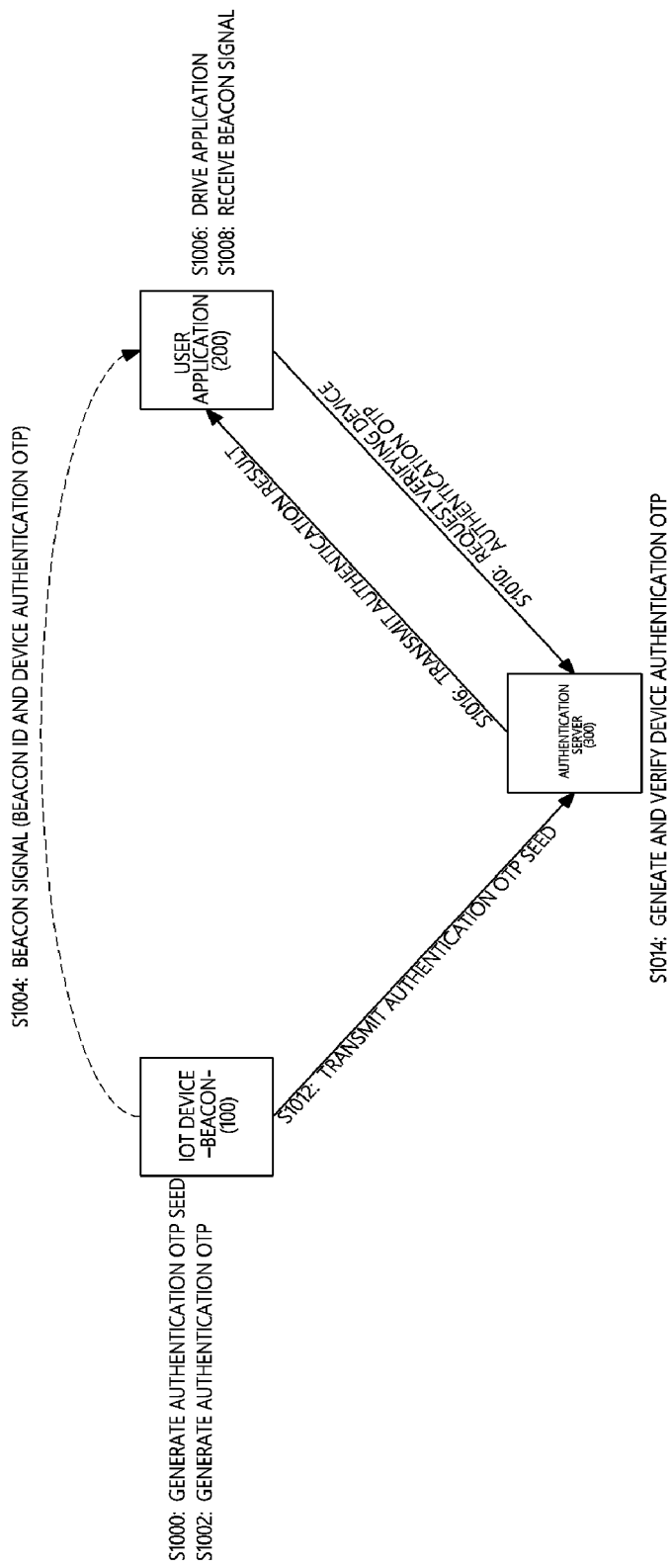
FIG. 16 is a diagram of a seventh exemplary embodiment for describing a method and a system for authentication in a mobile payment system when an IoT device having a beacon message transmission function is installed at a store.

FIG. 16 is a diagram of a seventh exemplary embodiment for describing a method and a system for authentication in a mobile payment system when an IoT device having a beacon message transmission function is installed at a store.

Referring to FIG. 16, the IoT device 100 generates the seed of the device authentication OTP [see S1000 of FIG. 16] and generates the device authentication OTP based on the generated seed [see S1002 of FIG. 16]. In addition, the IoT device 100 loads the beacon ID and the generated device authentication OTP on the beacon message and broadcasts the beacon message [see S1004 of FIG. 16].

When the broadcasted beacon signal is received by driving the user application 200 [see S1006 and S1008 of FIG. 16], the user application 200 may request the authentication server 300 to verify the device authentication OTP [see S1010 of FIG. 16].

In this case, the authentication server 300 generates the device authentication OTP by a method which is the same as the method in which the IoT device 100 generates the device authentication OTP and compares whether the autonomously generated device authentication OTP and the device authentication OTP received from the user application 200 coincide with each other to verify whether the IoT device broadcasting the beacon message is authentic [see S1014 of FIG. 16]. An authentication result at this time may be transmitted to the user application 200 [see S1016 of FIG. 16]. As a result, the user application 200 may check whether the corresponding IoT device is authentic.

In generating the device authentication OTP through step S1014 of FIG. 16, the authentication server 300 may use the seed received from the IoT device 100 according to step S1012 of FIG. 16. As one example, when the challenge and response method is used as the device authentication OTP generation method, the challenge value as the operation condition may be transmitted to the authentication server 300 through step S1012 of FIG. 16. Of course, it is apparent that another seed value may be transmitted.

However, in some cases, step S1012 of FIG. 16 may be omitted. For example, the beacon ID transmitted through S1004 of FIG. 16 is used as the seed of the device authentication OTP and in the case where the device authentication OTP is generated by the time OTP method, etc., step S1012 of FIG. 16 may be omitted. Further, the device authentication OTP seed may be transmitted to the authentication server 300 according to step S1012 of FIG. 16 at any time after step S1000 of FIG. 16 is executed, of course.

Hereinabove, based on the case of FIG. 1, additional introduction of the authentication process of the user side of FIG. 4, introduction of additional authentication of the IoT device through the authentication server of FIG. 5, and additional introduction of the authentication process associated with the authentication server of FIG. 6 have been described. However, although not clearly illustrated through the drawings, but technical contents of FIGS. 4, 5, and 6 may be introduced even in the case of FIG. 2, 3, or 16 by the same or similar method, of course.

Hereinabove, referring to FIGS. 1 to 6 and 16, the method and system for authentication assuming the case where the IoT device having the beacon signal transmission function is installed at the store has been described. Therefore, hereinafter, in FIGS. 7 to 12, a method and a system for authentication assuming a case where an IoT device having an NFC function is installed at the store will be described.

Figure 7:
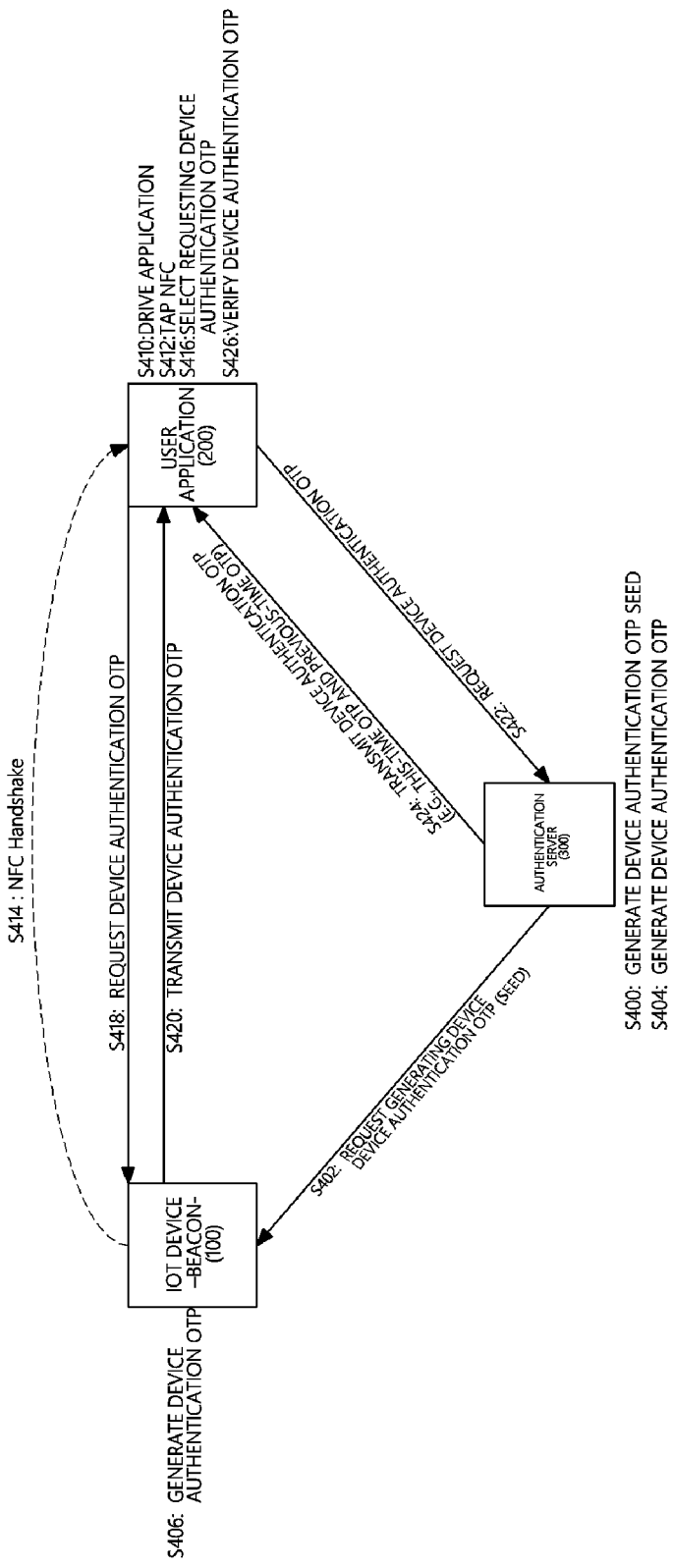
FIG. 7 is a diagram of a first exemplary embodiment for describing a method and a system for authentication in a mobile payment system when an IoT device having an NFC function is installed at a store.

FIG. 7 is a diagram of a first exemplary embodiment for describing a method and a system for authentication in a mobile payment system when an IoT device having an NFC function is installed at a store.

Herein, FIG. 7 which relates to the method and the system for authentication, which may correspond to the exemplary embodiment of FIG. 1 described above illustrates an exemplary embodiment of the case where the IoT device 100 has the NFC function. To this end, the IoT device 100 in the exemplary embodiment may be mounted with an NFC module and software for driving the NFC module in order to acquire the NFC function (hereinafter, similarly applied to FIGS. 8 to 12).

Referring to FIG. 7, similarly to the exemplary embodiment of FIG. 1, the OTP seed for the device authentication of the IoT device 100 is generated by the authentication server 300 and transmitted to the IoT device 100. Hereinafter, an authentication flow according to FIG. 7 will be described below. During the process of describing FIG. 7, the duplicated description of the contents regarding the same technical feature as the description of FIG. 1 is omitted.

First, the authentication server 300 generates the device authentication OTP seed [see S400 of FIG. 7] and requests generating the device authentication OTP while transmitting the generated seed to the IoT device 100 [S402 of FIG. 7]. At the same time, the authentication server 300 autonomously generates the device authentication OTP by using the corresponding seed [see S404 of FIG. 7] and the IoT device 100 also generates the device authentication OTP by using received seed.

Thereafter, when the user application 200 is driven [see S410 of FIG. 7] and the user performs NFC tap in the IoT device 100 by using the mobile device possessed thereby [see S412 of FIG. 7], a communication session may be configured between the mobile device of the user and the IoT device 100 through NFC handshake [see S414 of FIG. 7].

In this case, as the user directly or the user application 200 automatically selects the device authentication OTP request [see S416 of FIG. 7], the user application 200 may request each of the IoT device 100 and the authentication server 300 to transmit the device authentication OTP [see S418 and S422 of FIG. 7]. When the device authentication OTP is transmitted from each of the IoT device 100 and the authentication server 300 as a response to the request [see S420 and S424 of FIG. 7], the user application 200 compares whether the device authentication OTP received from the IoT device 100 and the device authentication OTP received from the authentication server 300 coincide with ach other to determine (verify) whether the IoT device 100 is authentic [see S526 of FIG. 7].

Figure 8:
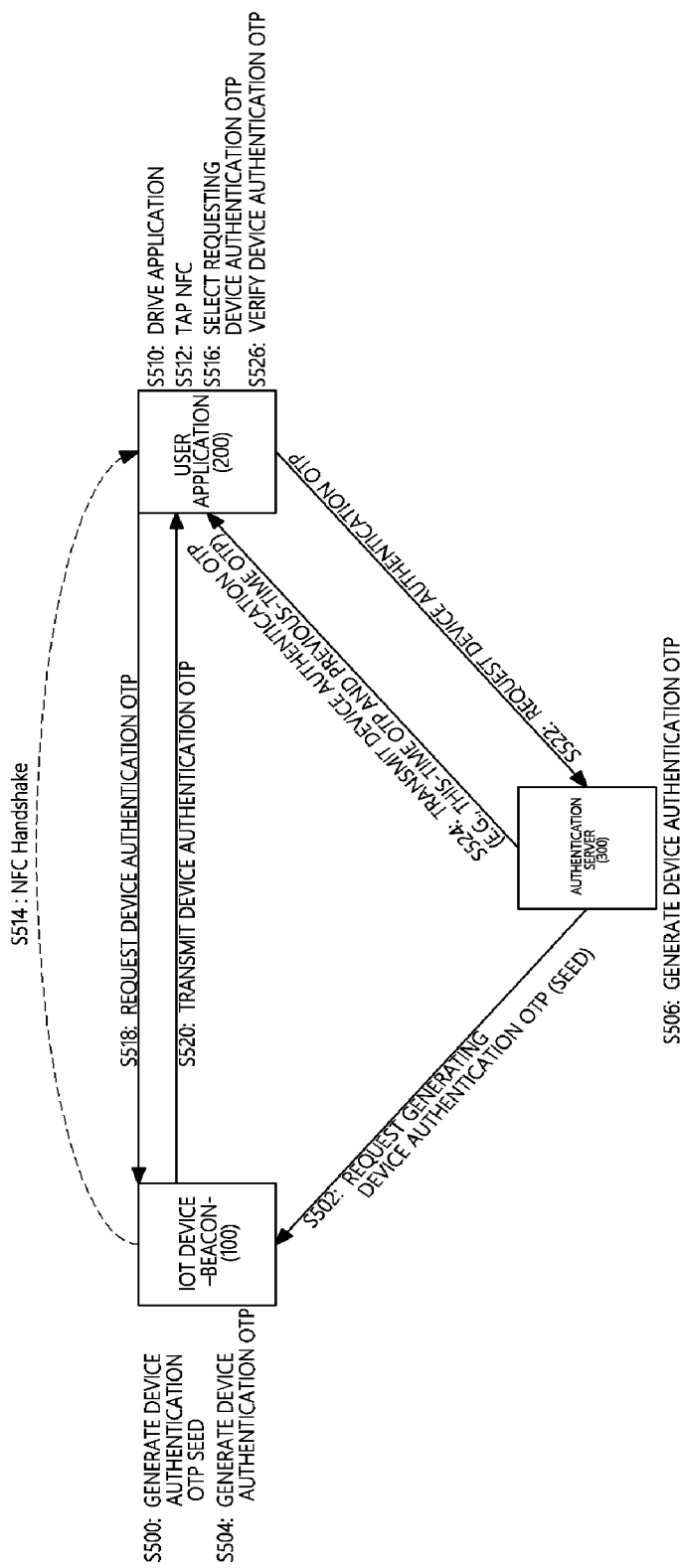
FIG. 8 is a diagram of a second exemplary embodiment for describing a method and a system for authentication in a mobile payment system when an IoT device having an NFC function is installed at a store.

FIG. 8 is a diagram of a second exemplary embodiment for describing a method and a system for authentication in a mobile payment system when an IoT device having an NFC function is installed at a store.

Herein, FIG. 8 which relates to the method and the system for authentication, which may correspond to the exemplary embodiment of FIG. 2 described above illustrates an exemplary embodiment of the case where the IoT device 100 has the NFC function. Referring to FIG. 8, similarly to the exemplary embodiment of FIG. 2, the OTP seed for the device authentication of the IoT device 100 is autonomously generated by the IoT device 100 and transmitted to the authentication server 300. Hereinafter, the authentication flow according to FIG. 8 will be described below. During the process of describing FIG. 8, the duplicated description of the contents regarding the same technical feature as the description of FIG. 2 is omitted.

The IoT device 100 generates the device authentication OTP seed and generates the device authentication OTP by using the generated device authentication OTP seed [see S500 and S504 of FIG. 8]. In this case, the generated seed is transmitted to the authentication server 300 [see S502 of FIG. 8] and the authentication server 300 generates the device authentication OTP by using the received seed [see S506 of FIG. 8].

Thereafter, when the driving of the user application 200 [see S510 of FIG. 8], the NFC tap [see S512 of FIG. 8], the NFC handshake [see S514 of FIG. 8], and selection of the device authentication OTP request [see S516 of FIG. 8] are achieved, the user application 200 may request each of the IoT device 100 and the authentication server 300 to transmit the device authentication OTP [see S518 and S522 of FIG. 8]. When the device authentication OTP is transmitted from each of the IoT device 100 and the authentication server 300 as the response to the request [see S520 and S524 of FIG. 8], the user application 200 compares whether the device authentication OTP received from the IoT device 100 and the device authentication OTP received from the authentication server 300 coincide with each other to determine (verify) whether the IoT device 100 is authentic [see S526 of FIG. 8].

In the present specification, in the case in which the IoT device 100 has the NFC function, a drawing regarding the exemplary embodiment corresponding to FIG. 3 is not separately illustrated, but a method which is similar to the technical method described in FIG. 3 may be applied, of course.

Figure 9:
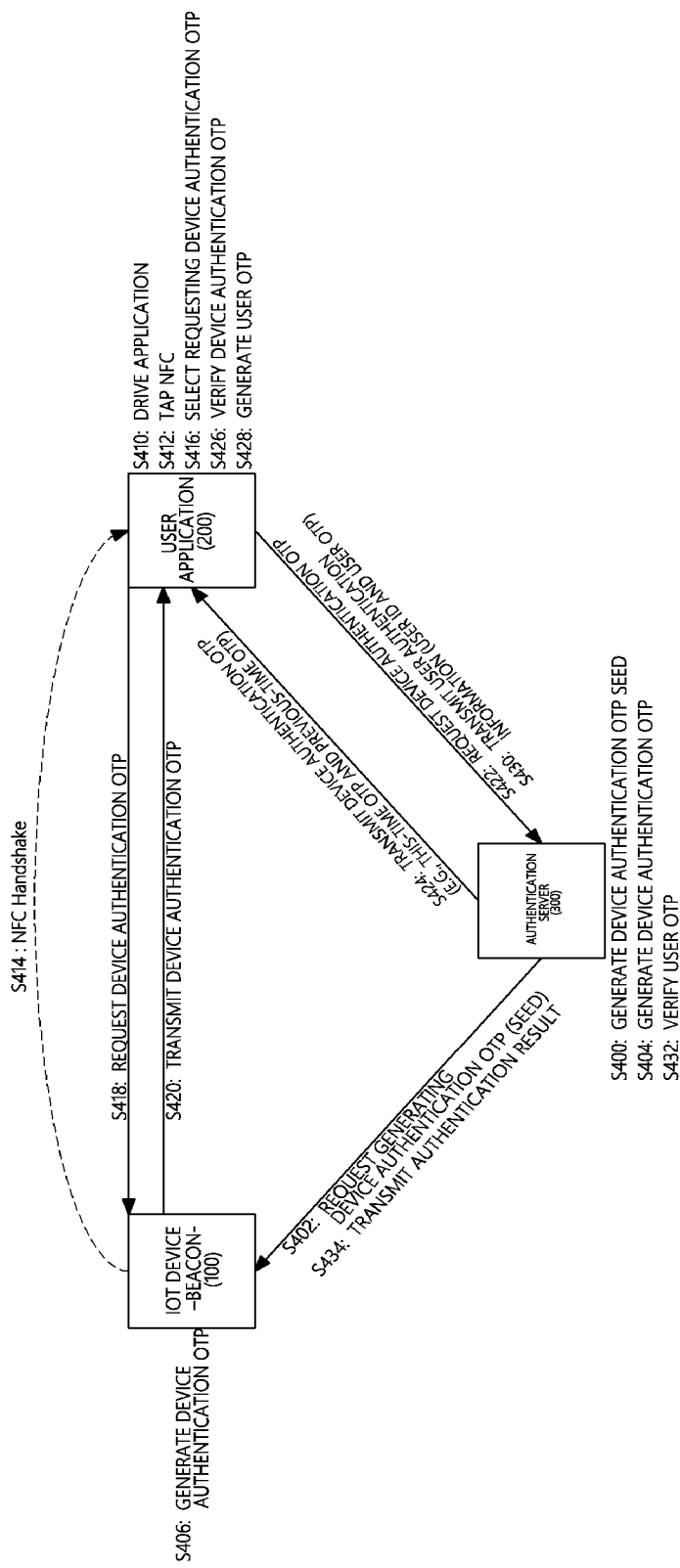
FIG. 9 is a diagram of a third exemplary embodiment for describing a method and a system for authentication in a mobile payment system when an IoT device having an NFC function is installed at a store.

FIG. 9 is a diagram of a third exemplary embodiment for describing a method and a system for authentication in a mobile payment system when an IoT device having an NFC function is installed at a store.

Herein, FIG. 9 which relates to the method and the system for authentication, which may correspond to the exemplary embodiment of FIG. 4 described above illustrates an exemplary embodiment of the case where the IoT device 100 has the NFC function. Referring to FIG. 9, similarly to the exemplary embodiment of FIG. 4, the authentication of the user side is also performed after the device authentication process of the IoT device 100. Hereinafter, the authentication flow according to FIG. 9 will be described below. During the process of describing FIG. 9, the duplicated description of the contents regarding the same technical feature as the description of FIG. 4 is omitted.

S400 to S426 of FIG. 9 as the contents regarding the device authentication process of the IoT device 100 are the same as the steps in FIG. 7 described above. When the device authentication of the IoT device 100 is completed through such a process, the user application 200 may generate the authentication value (the user OTP in this example) for the authentication of the user side [see S428 of FIG. 9] and transmit the user authentication information to the authentication server 300 [see S430 of FIG. 9].

As a result, the authentication server 300 generates the authentication value for the authentication of the user side by a method which is the same as the method in which the user application 200 generates the corresponding authentication value and compares whether the autonomously generated user authentication value and the user authentication value received from the user application 200 coincide with each other to authenticate the user side is authentic [see S432 of FIG. 9]. The corresponding authentication result may be transmitted to the IoT device 100 [see S434 of FIG. 9].

Figure 10:
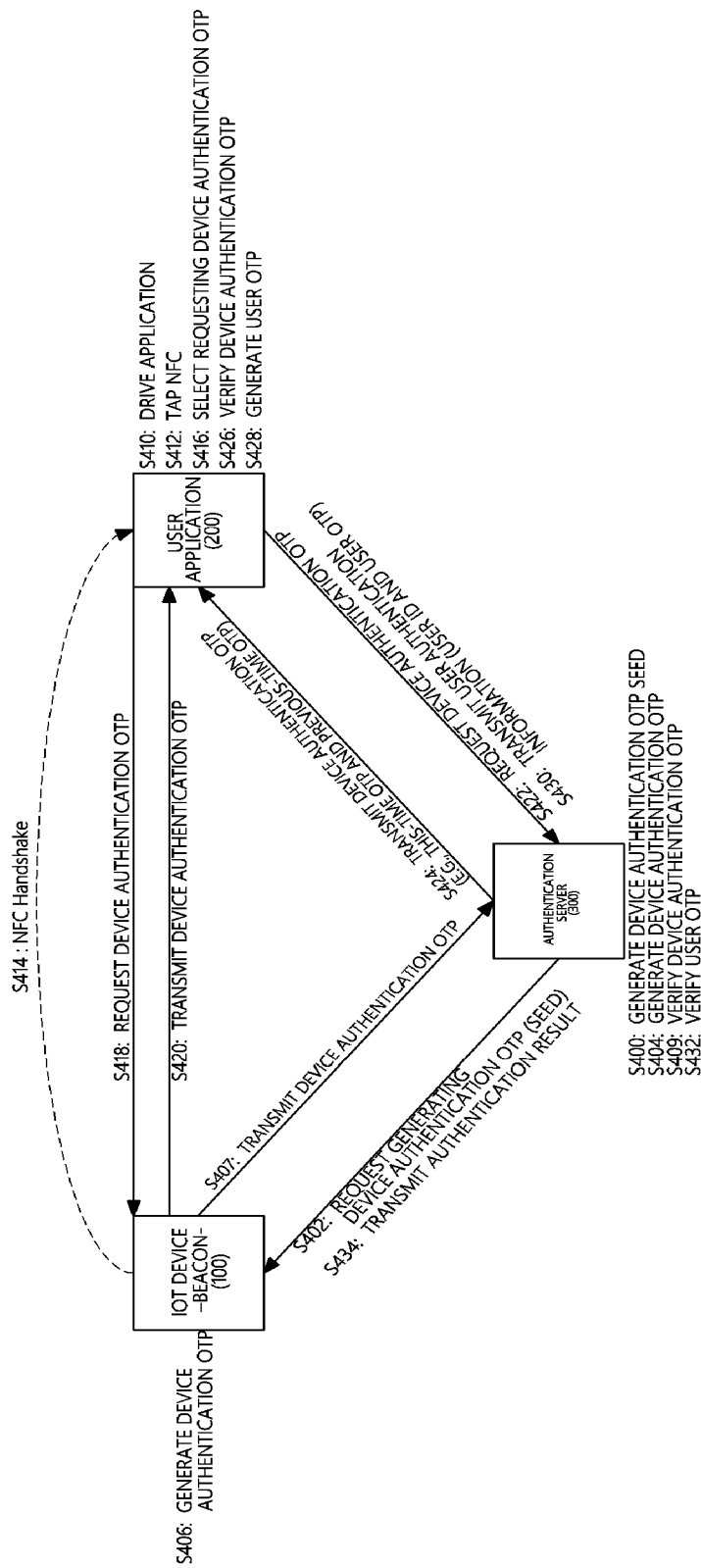
FIG. 10 is a diagram of a fourth exemplary embodiment for describing a method and a system for authentication in a mobile payment system when an IoT device having an NFC function is installed at a store.

FIG. 10 is a diagram of a fourth exemplary embodiment for describing a method and a system for authentication in a mobile payment system when an IoT device having an NFC function is installed at a store.

Herein, FIG. 10 which relates to the method and the system for authentication, which may correspond to the exemplary embodiment of FIG. 5 described above illustrates an exemplary embodiment of the case where the IoT device 100 has the NFC function. Referring to FIG. 10, all processes other than steps S407 and S409 of FIG. 10 are the same as those in FIG. 9. However, similarly to the exemplary embodiment of FIG. 5, the device authentication process of the IoT device 100 is performed even by the authentication server 300 as well as the user application 200. Herein, steps S407 and S409 of FIG. 10 are steps associated with the case in which the device authentication of the IoT device 100 is performed by the authentication server 300.

Figure 11:
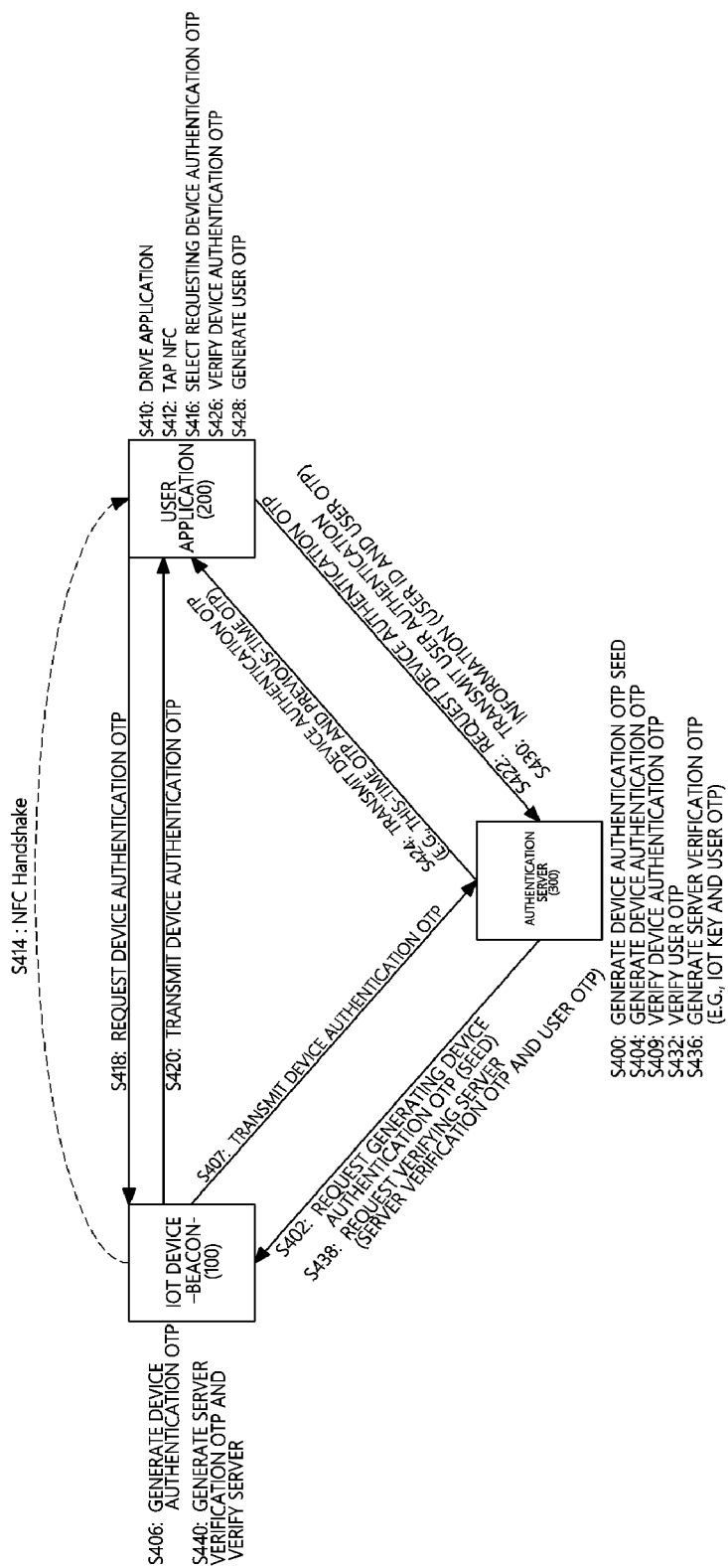
FIG. 11 is a diagram of a fifth exemplary embodiment for describing a method and a system for authentication in a mobile payment system when an IoT device having an NFC function is installed at a store.

FIG. 11 is a diagram of a fifth exemplary embodiment for describing a method and a system for authentication in a mobile payment system when an IoT device having an NFC function is installed at a store.

Herein, FIG. 11 which relates to the method and the system for authentication, which may correspond to the exemplary embodiment of FIG. 6 described above illustrates an exemplary embodiment of the case where the IoT device 100 has the NFC function. Referring to FIG. 11, similarly to the exemplary embodiment of FIG. 6, the authentication of the authentication server is also performed after the device authentication process of the IoT device 100 and the user authentication process are completed. Hereinafter, the authentication flow according to FIG. 11 will be described below.

S400 to S432 of FIG. 11 as the contents regarding the device authentication process of the IoT device 100 are the same as the steps in FIG. 10 described above. When the device authentication of the IoT device 100 and the user authentication are completed through such a process, the server authentication process is performed. The server authentication process is performed by S436, S438, and S440 of FIG. 11 and this is fundamentally the same as the contents described in FIG. 6.

Figure 12:
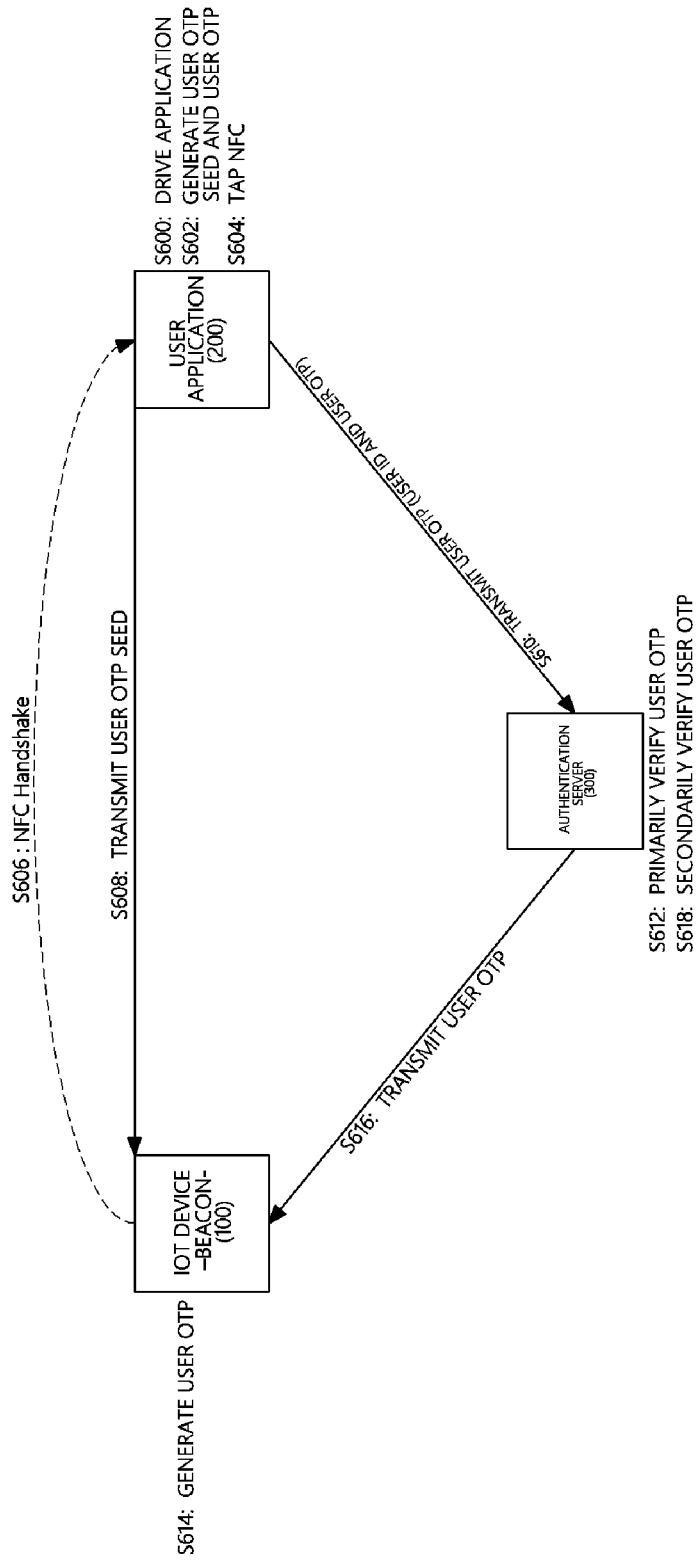
FIG. 12 is a diagram of a sixth exemplary embodiment for describing a method and a system for authentication in a mobile payment system when an IoT device having an NFC function is installed at a store.

FIG. 12 is a diagram of a sixth exemplary embodiment for describing a method and a system for authentication in a mobile payment system when an IoT device having an NFC function is installed at a store. Herein, the sixth exemplary embodiment shows a flowchart of a method in which the authentication server 300 authenticates the user. Hereinafter, the flowchart will be described below in detail.

When the user application 200 is driven [see S600 of FIG. 12], the user application 200 generates the user OTP seed and generates the user authentication value (the user OTP in this example) by using the generated seed [see S602 of FIG. 12]. Thereafter, when the NFC tap [see S604 of FIG. 12] and the NFC handshake [see S606 of FIG. 12] are performed, the user application 200 may transmit the corresponding seed to the IoT device 100 [see S608 of FIG. 12] and transmit the generated user OTP and user identification information (the user ID in this example) to the authentication server 300 [see S610 of FIG. 12].

As a result, the authentication server 300 autonomously generates the user OTP by a method which is the same as the method in which the user application 200 generates the OTP and compares whether the autonomously generated user OTP and the user OTP received from the user application 200 coincide with each other to primarily verify the user OTP [see S612 of FIG. 12].

Further, as the seed is received, the IoT device 100 autonomously generates the user OTP by the method which is the same as the method in which the user application 200 generates the OTP [see S614 of FIG. 12] and transmits the generated user OTP to the authentication server 300 [see S616 of FIG. 12].

As a result, the authentication server 300 compares whether the autonomously generated user OTP and the user OTP received from the IoT device 100 coincide with each other to secondarily verify the user OTP [see S618 of FIG. 12].

Through the process, the authentication server 300 may simultaneously authenticate the user side and the IoT device. That is, the authentication server 300 may authenticate whether the user side is authentic through the primary verification process of the user OTP and authenticate whether the IoT device is authentic through the secondary verification process of the user OTP. The secondary verification process of the user OTP is a process in which the authentication server 300 verifies the user OTP generated by the IoT device 100 by using the seed received from the user application 200. Therefore, the authentication server 300 may also indirectly verify whether the IoT device 100 is authentic by the process.

Hereinabove, it is illustrated and described as if the user OTP is transmitted to the authentication server 300 after the NFC tap and the NFC handshake are performed, but the transmission need not particularly be performed after the NFC tap and the NFC handshake are performed. That is, the user OTP may be transmitted to the authentication server at any time after the OTP is generated according to S602 of FIG. 12, of course.

Figure 13:
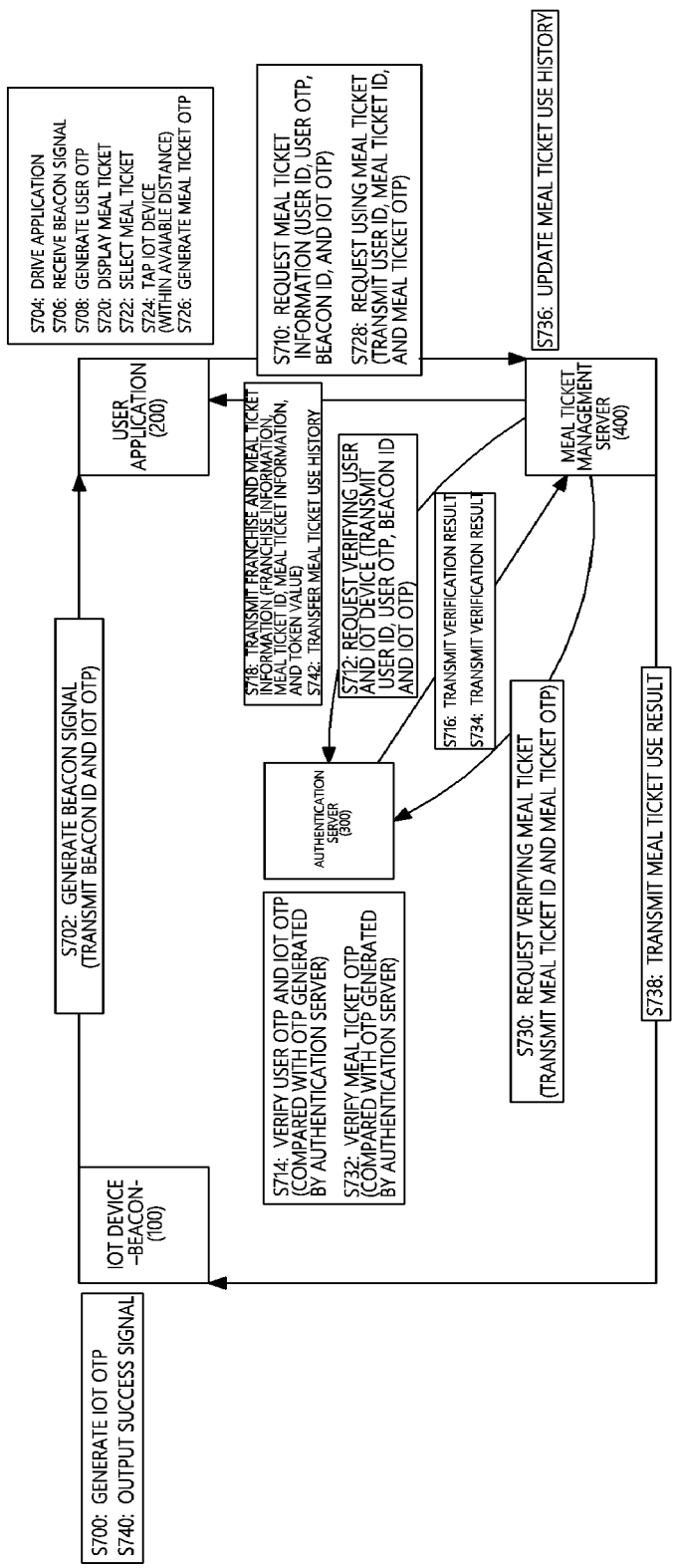
FIG. 13 is a diagram of a first exemplary embodiment for describing a method and a system for issuing a meal ticket in a mobile payment system when an IoT device is installed at a store.

FIG. 13 is a diagram of a first exemplary embodiment for describing a method and a system for issuing a meal ticket in a mobile payment system when an IoT device is installed at a store.

The meal ticket issuing system of FIG. 13 may include the IoT device 100 having the beacon signal transmission function, the user application 200 installed in the mobile device of the user, the authentication server 300, and a meal ticket management server 400. In this case, the user application 200 may be communication-connected with the IoT device 100 and the meal ticket management server 400 through wireless communication and the meal ticket management server 400 may be communication-connected with the IoT device 100 and the authentication server 300 through the wired or wireless communication.

Referring to FIG. 13, the IoT device 100 may generate the device authentication OTP (see the IoT OTP of FIG. 13, hereinafter, similarly even in FIGS. 14 and 15) for providing whether the device itself is authentic [see S700 of FIG. 13] and loads the beacon ID and the generated device authentication OTP on the beacon message and broadcast the beacon message to the outside [see S702 of FIG. 13].

As the user application 200 is driven [see S704 of FIG. 13], the user application 200 may receive the beacon signal [see S706 of FIG. 13], and as a result, the user application 200 may generate the user OTP for proving whether the user or the corresponding application is authentic [see S708 of FIG. 13].

Thereafter, the user application 200 requests meal ticket information to the meal ticket management server 400 [see S710 of FIG. 13]. In this case, the user application 200 may simultaneously transmit the user identification information (the user ID in this example), the autonomously generated user OTP, and IoT device information (that is, Beacon ID and IoT OTP) received through the beacon signal to the meal ticket management server 400 through a meal ticket information request process.

The meal ticket management server 400 receiving the meal ticket information request requests the authentication server 300 to verify the corresponding user and the corresponding IoT device [see S712 of FIG. 13]. To this end, the meal ticket management server 400 may transmit the information (that is, the user ID, the user OTP, the Beacon ID, and the IoT OTP) received from the user application 200 to the authentication server 300 through step S712 of FIG. 13.

As a result, the authentication server 300 may identify the corresponding user and the corresponding IoT device according to the received user ID and Beacon ID and autonomously generate the user OTP and IoT OTP by using the OTP generation method (that is, the method which is the same as the method of generating the OTP in each of the user application 200 and the IoT device 100) which is shared in advance. The authentication server 300 compares whether the autonomously generated user OTP and IoT OTP and the user OTP and IoT OTP received from the meal ticket management server 400 coincide with each other to verify whether the corresponding user and the IoT device are authentic [see S714 of FIG. 13] and transmits a result of the verification to the meal ticket management server 400 [see S716 of FIG. 13].

When the authentication is successful as the received verification result, the meal ticket management server 400 transmits information on a franchise and meal ticket associated information (a meal ticket ID, meal ticket information, and a token value in this example) provided by the corresponding franchise to the user application 200 [see S718 of FIG. 13]. Herein, the token value may be used as seed information at the time of generating a meal ticket OTP afterwards.

When the franchise information and the meal ticket associated information are received, the user application 200 may display the meal ticket information through an application screen based on the received information [see S720 of FIG. 13]. When the user selects the meal ticket on the screen of the user application 200 [see S722 of FIG. 13] and taps the IoT device 100 [see S724 of FIG. 13], the user application 200 generates the meal ticket OTP [see S726 of FIG. 13]. In this case, since the IoT device 100 operates by a beacon mode, when the IoT device is tapped within a designated effective distance between the mobile device of the user and the IoT device, the corresponding event will be normally processed. Further, in this case, as the meal ticket OTP, all or some of the information received through S718 of FIG. 7 may be used. In addition, the meal ticket OTP may be generated as a transaction interlocking OTP and in this case, transaction associated information such as the number of tickets, the amount of money, etc., may also be further used as the seed for generating the OTP.

Thereafter, the user application 200 requests the meal ticket management server 400 to use the meal ticket [see S728 of FIG. 13]. During the meal ticket using request process, the information such as the user ID, the meal ticket ID, the meal ticket OTP, etc., may be simultaneously transmitted to the meal ticket management server 400.

When the meal ticket using request is received, the meal ticket management server 400 requests the authentication server 300 to verify the meal ticket [see S730 of FIG. 13]. During the meal ticket verifying request process, the information such as the meal ticket ID, the meal ticket OTP, etc., may be simultaneously transmitted to the authentication server 300.

As a result, the authentication server 300 autonomously generates the meal ticket OTP based on the received meal ticket ID, etc. The authentication server 300 compares whether the autonomously generated meal ticket OTP and the meal ticket OTP received from the meal ticket management server 400 coincide with each other to verify whether the meal ticket OTP received from the meal ticket management server 400 (that is, generated by the user application 200) is authentic (alternatively, whether the meal ticket OTP is available) [see S732 of FIG. 13]. A result of verifying the meal ticket OTP is transmitted to the meal ticket management server 400 [see S734 of FIG. 13].

When the verification is successful as the meal ticket OTP verification result, the meal ticket management server 400 may update a meal ticket use history [see S736 of FIG. 13], transmit a meal ticket use result to the IoT device 100 [see S738 of FIG. 13], and transmit the meal ticket use history to the user application 200 [see S742 of FIG. 13]. In this case, the IoT device 100 may output a success signal for announcing that using the meal ticket is successful by a visual or/and auditory method [see S740 of FIG. 13].

In FIG. 13 described above, steps S700 to S714 are procedures for device authentication and user authentication. Therefore, steps S700 to S714 of FIG. 13 may be substituted with the procedures of FIGS. 1 to 12 and 16 described above, of course. Further, steps S700 to S714 of FIG. 13 are implemented to simultaneously perform the device authentication and the user authentication, but the device authentication process may be substituted with the device authentication process according to FIGS. 1 to 12 and 16 and the user authentication process may be modified to be performed together with the verification process of the meal ticket OTP, of course. This is similar even in the cases of FIGS. 14 and 15 to be described below.

Figure 14:
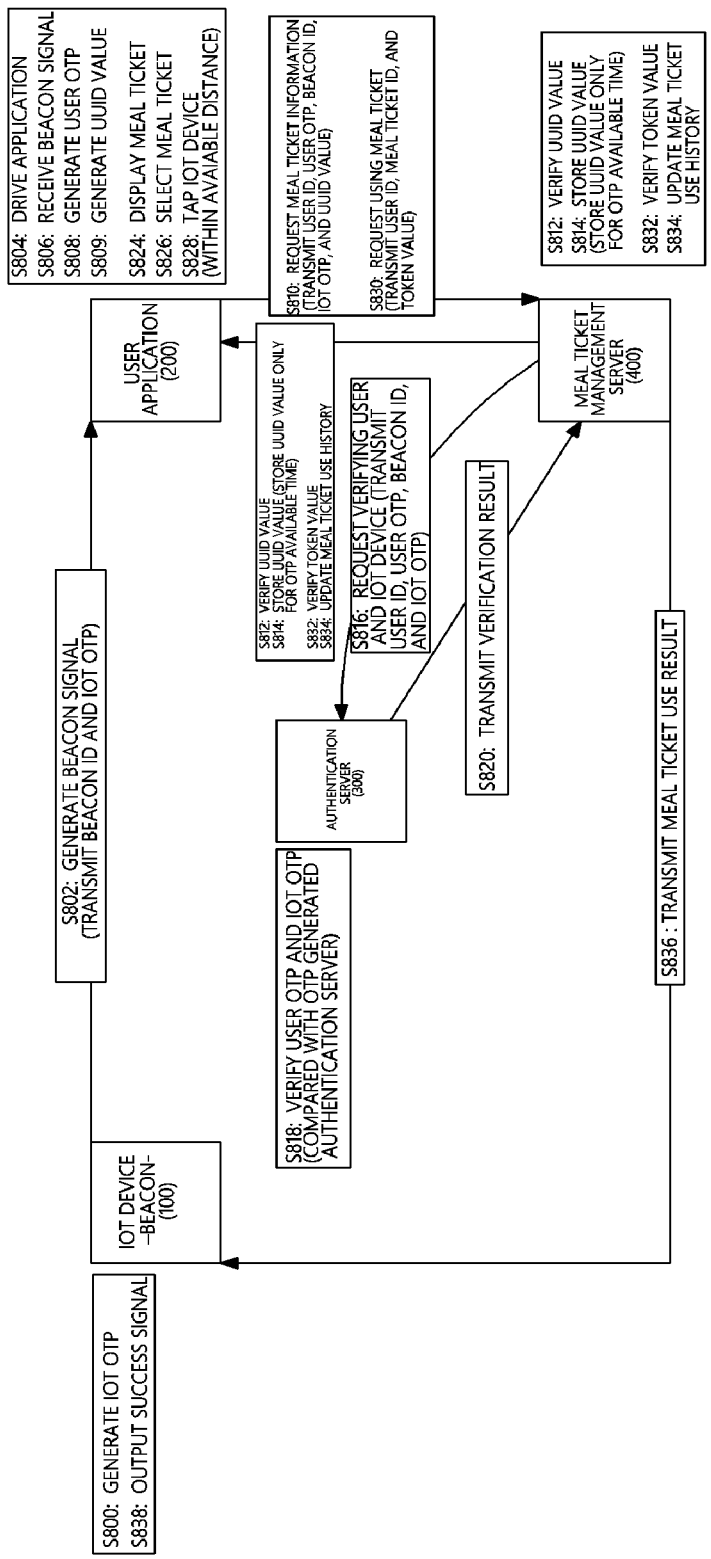
FIG. 14 is a diagram of a second exemplary embodiment for describing a method and a system for issuing a meal ticket in a mobile payment system when an IoT device is installed at a store.

FIG. 14 is a diagram of a second exemplary embodiment for describing a method and a system for issuing a meal ticket in a mobile payment system when an IoT device is installed at a store. The meal ticket issuing system of FIG. 14 may include the IoT device 100 having the beacon signal transmission function, the user application 200 installed in the mobile device of the user, the authentication server 300, and the meal ticket management server 400. During the process of describing FIG. 14, the description of the contents which may be duplicated with FIG. 13 given above is omitted.

Referring to FIG. 14, the IoT device 100 may generate the device authentication OTP (see the IoT OTP of FIG. 14) for providing whether the device itself is authentic [see S800 of FIG. 14] and loads the beacon ID and the generated device authentication OTP on the beacon message and broadcast the beacon message to the outside [see S802 of FIG. 14].

As the user application 200 is driven [see S804 of FIG. 14], the user application 200 may receive the beacon signal [see S806 of FIG. 14], and as a result, the user application 200 may generate the user OTP for proving whether the user or the corresponding application is authentic [see S808 of FIG. 14].

Further, in this case, the user application 200 may generate a kind of serial number information (expressed as the UUID in this example) for checking the number of meal ticket use attempt times by the corresponding user [see S809 of FIG. 14]. The beacon signal is broadcasted and the corresponding information may be extorted by a hacker and further, when the user OTP is further extorted by the hacker, there is a possibility that the meal ticket will be duplicatively used by the hacker within the available time of the corresponding OTP. Therefore, in the exemplary embodiment of FIG. 14, information to check the number of meal ticket use attempt times is additionally generated to prevent such a problem.

Thereafter, the user application 200 requests the meal ticket information to the meal ticket management server 400 [see S810 of FIG. 14]. In this case, the user application 200 may simultaneously transmit the user ID, the autonomously generated user OTP, the Beacon ID, the IoT OTP, and the autonomously generated UUID value to the meal ticket management server 400 through the meal ticket information request process.

The meal ticket management server 400 receiving the meal ticket information request verifies the UUIC value for the number of meal ticket use attempt times of the corresponding user [see S812 of FIG. 14] and stores the corresponding UUID value [see S814 of FIG. 14]. In this case, the UUID value may be stored only for the available time o the user OTP. Further, the meal ticket management server 400 requests the authentication server 300 to verify the corresponding user and the corresponding IoT device [see S816 of FIG. 14]. To this end, the meal ticket management server 400 may transmit the information (that is, the user ID, the user OTP, the Beacon ID, and the IoT OTP) received from the user application 200 to the authentication server 300 through step S816 of FIG. 14.

As a result, the authentication server 300 may identify the corresponding user and the corresponding IoT device according to the received user ID and Beacon ID and autonomously generate the user OTP and IoT OTP by using the OTP generation method (that is, the method which is the same as the method of generating the OTP in each of the user application 200 and the IoT device 100) which is shared in advance. The authentication server 300 compares whether the autonomously generated user OTP and IoT OTP and the user OTP and IoT OTP received from the meal ticket management server 400 coincide with each other to verify whether the corresponding user and the IoT device are authentic [see S818 of FIG. 14] and transmits a result of the verification to the meal ticket management server 400 [see S820 of FIG. 14].

When the authentication is successful as the received verification result, the meal ticket management server 400 transmits information on a franchise and meal ticket associated information (a meal ticket ID, meal ticket information, and a token value in this example) provided by the corresponding franchise to the user application 200 [see S822 of FIG. 14].

When the franchise information and the meal ticket associated information are received, the user application 200 may display the meal ticket information through an application screen based on the received information [see S824 of FIG. 14]. The user selects the meal ticket on the screen of the user application 200 [see S826 of FIG. 14] and taps the IoT device 100 [see S828 of FIG. 14]. In this case, since the IoT device 100 operates by a beacon mode, when the IoT device is tapped within a designated effective distance between the mobile device of the user and the IoT device, the corresponding event will be normally processed.

Thereafter, the user application 200 requests the use of the meal ticket to the meal ticket management server 400 [see S830 of FIG. 14]. During the meal ticket using request process, the information such as the user ID, the meal ticket ID, the token value, etc., may be simultaneously transmitted to the meal ticket management server 400.

When the meal ticket using request is received, the meal ticket management server 400 may verify the received token value [see S832 of FIG. 14], when the verification is successful, the meal ticket management server 400 may update the meal ticket use history [see S834 of FIG. 14], transmit the meal ticket use result to the IoT device 100 [see S836 of FIG. 14], and transmit the meal ticket use history to the user application 200 [see S840 of FIG. 14]. In this case, the IoT device 100 may output the success signal for announcing that using the meal ticket is successful by the visual or/and auditory method [see S838 of FIG. 14].

In FIG. 14, the method in which the token value received through S822 is just transmitted to the meal ticket management server 400 during the meal ticket using request process through S830 is exemplified, but as illustrated in FIG. 7, the method that generates and transmits the meal ticket OTP and verifies the meal ticket OTP may be used, of course. Further, in FIG. 14, the meal ticket management server 400 verifies the token value through S832, but this may also be substituted with the method in which the authentication sever 300 verifies the meal ticket OTP as illustrated in FIG. 7.

Figure 15:
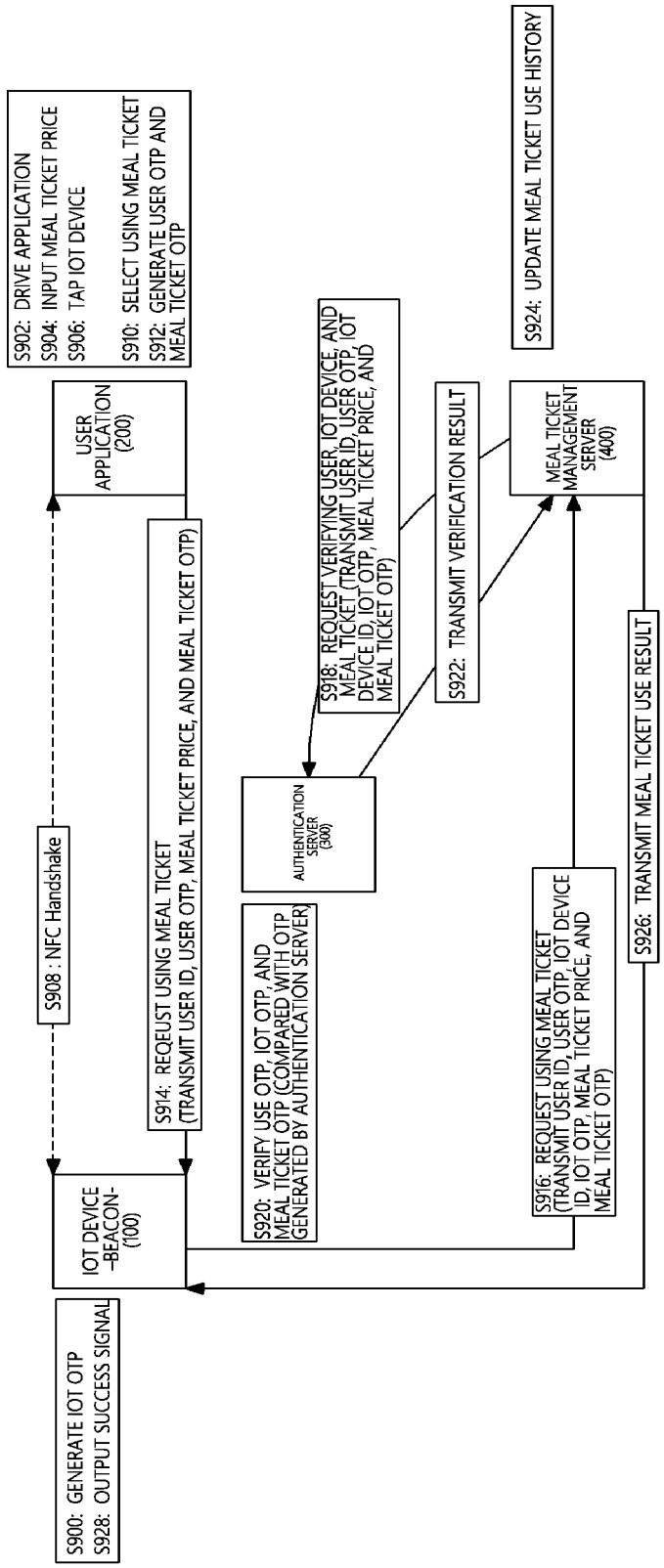
FIG. 15 is a diagram of a third exemplary embodiment for describing a method and a system for issuing a meal ticket in a mobile payment system when an IoT device is installed at a store.

FIG. 15 is a diagram of a third exemplary embodiment for describing a method and a system for issuing a meal ticket in a mobile payment system when an IoT device is installed at a store.

The meal ticket issuing system of FIG. 15 may include the IoT device 100 having the NFC function, the user application 200 installed in the mobile device of the user, the authentication server 300, and the meal ticket management server 400. During the process of describing FIG. 15, the description of the contents which may be duplicated with FIGS. 13 and 14 given above is omitted.

Referring to FIG. 15, a generation step of the IoT OTP according to S900, an application driving step according to S902, a tapping step of the IoT device according to S906, a meal ticket using selection step according to S910, a user OTP and meal ticket OTP generating step according to S912, a user and IoT device verifying request step according to S918, a user and IoT device verifying step according to S920, a verification result transmitting step according to S922, a meal ticket use history updating step according to S924, a meal ticket use result transmitting step according to S926, and a success signal output step according to S928 are fundamentally the same as those in the exemplary embodiment of FIG. 13 or 14.

However, in a near-field communication (NFC) technology, since bidirectional communication is enabled between the devices through an NFC handshake operation of S908, the meal ticket associated information may be directly transferred from the IoT device 100 to the user application 200. Therefore, the meal ticket associated information is directly transferred from the IoT device 100 to be displayed through the screen of the user application 200, and as a result, the user may select the meal ticket. As one example, step S904 of FIG. 15 exemplifies a case of inputting a meal ticket price during the meal ticket selecting process.

Further, when the bidirectional communication is used through the NFC technology, using the meal ticket may be directly requested from the user application 200 to the IoT device 100. Referring to S912 of FIG. 15, it may be verified that the user application 200 requests using the meal ticket while transmitting the user ID, the user OTP, the meal ticket price, the meal ticket OTP, etc., to the IoT device 100. Herein, the meal ticket price need not particularly be separately transmitted and may be used only as the seed information for generating the meal ticket OTP, of course.

According to the exemplary embodiment of the present invention, the IoT device 100 that requests using the meal ticket transfers the meal ticket using request to the meal ticket management server 400 [see S916 of FIG. 15]. In this case, the IoT device 100 may transfer the information (see the IoT device ID and the IoT OTP in the case of S916 of FIG. 15) for authenticating the device to the meal ticket management server 400 together. As a result, the meal ticket management server 400 may simultaneously request the user authentication, the device authentication, and the meal ticket authentication to the authentication server 300 [see S918 of FIG. 15] and the authentication server 300 may perform the authentications [see S920 of FIG. 15], and transmit the authentication result to the meal ticket management server 400.

FIG. 17 is a diagram of an exemplary embodiment for describing a method and a system for authentication capable of simultaneously authenticating a user and an IoT device by using an IoT device having a beacon message transmission function and mobile applications which are installed on a mobile device.

Referring to FIG. 17, a system is disclosed, which includes an IoT device 100, a user application 200 installed in a mobile device of a user, and an authentication server 300. In this case, the IoT device 100 and the user application 200 may be connected to each other and the user application 200 and the authentication server 300 may be connected to each other through wireless communication, and the IoT device 100 and the authentication server 300 may be connected to each other through wired communication or the wireless communication. In this case, it is assumed that the IoT device 100 basically has a beacon message transmission function. Hereinafter, an authentication flowchart of FIG. 17 will be described.

In the exemplary embodiment of the present invention, the IoT device 100 transmits a device identification value, a service identification value, and a device authentication value loaded in a beacon message to the outside through the beacon message (see S1100 in FIG. 17). Herein, the service identification value refers to a unique value that can identify a specific application service that may be serviced by the corresponding IoT device 100, the device identification value refers to a unique value that can identify the IoT device 100 that actually provides the corresponding service, and the device authentication value refers to a value that can check that the IoT device 100 providing the corresponding service is an authentic service device that is not forged.

In the exemplary embodiment of the present invention, as a method of inserting the device identification value and the device authentication value to the beacon message, the following method may be used.

In general, according to an operation method, the beacon is operated so as to read a major field value and a minor field value of the beacon of a corresponding UUID only when a UUIC value which coincides with the UUIC value of the beacon is loaded on the beacon message (in the case of iOS) or operated by a method that filters and uses only the self-UUID among all beacon UUIDs received at a beacon frequency (in the case of android OS). Further, in general, in the beacon, at least one of unique UUIDs for identifying the service provided according to the corresponding beacon is selected and used as a service unique value and the major/minor field has been used as a building name or a designated location. However, in the case where at least one UUID value or the major/minor field is used as described above, when a beacon value is read by a beacon scanner, the beacon that generates the same beacon value is generated as if the beacon exists on the spot and the generated beacon is read through a user application, a situation may be fabricated as if even a user who does not visit the corresponding beacon location visits the corresponding location. The reason is that since an opened frequency is used in the beacon, when the beacon is scanned by a general mobile device, the scanned beacon value may be read. Therefore, in order to use the beacon in a more delicate area such as a financial transaction or verification of the visitation location or check of visitation device (a vehicle, a robot, etc.), it should be able to be proved that the beacon frequency is not fabricated by a secondary provider.

To this end, in the exemplary embodiment of the present invention, in the case where one or 20 beacon UUID values or less are recommended to be used in the same service, for example, the UUID is used as a unique service identifier and the UUID may be used by configuring the major field as a device identification value (that is, the beacon ID) and the minor field as an authentication value (for example, a device authentication OTP, etc.).

In this case, in the beacon message, the length of a usable data field varies for each of beacon methods (e.g., iBeacon, Eddystone, etc.), but in general, information which may be transferred is limitative unlike NFC, and as a result, as a method that inserts a device authentication value into the beacon message, the following method may be used. In the following description, a case where the major field is constituted by 2 bytes and the minor field is constituted by 2 bytes on the beacon message is assumed and will be described.

According to a system configuration, if one device is provided in one service, the entirety of 4 bytes of the major and minor fields next to one UUID may be used as the device authentication value, but if multiple devices need to be authenticated in the same service, the major field of 2 bytes may be used as the device identification value and the minor field of 2 bytes used as the device authentication value next to one service UUID.

In this case, when the entirety of 4 bytes is constituted by a hexa string, the device authentication value may be expressed by 65536 and when only the minor field of 2 bytes is used for inserting the device authentication value, the device authentication value may be expressed by 65536 which is 16 square of 2 when 2 bytes are expressed by bits. Further, in some cases, when the generated device authentication value is more than 65536, the device authentication value may be processed to be converted into a value which is not more than 65536 or when the device authentication value is generated, the device authentication value may be processed to be generated as an authentication value which is equal to or less than 65536. In this case, when the number of used beacons is more than 65000 according to a service configuration, a maximum of 20 UUID values are additionally set to increase the number of beacons.

Further, in the exemplary embodiment of the present invention, the device authentication value may be an encrypted fixed value (e.g., a fixed key) for authentication of the corresponding device, but may also be generated by a variable value (e.g., a one time password (OTP), etc.) which varies according to time or specific conditions.

When the OTP among the variable values is used as the device authentication value, the authentication server 300 and the IoT device 100 may share a generation condition, a generation method, or a generation algorithm of the device authentication OTP which is common in advance. In general, the OTP generation method includes a time OTP method and a challenge and response method. Herein, the time OTP method is a method that generates the OTP by using a generation time as an operation condition. By the method, in the OTP, a value acquired by multiplying a determined specific OTP generation key by the generation time as the operation condition may be generated as a value encrypted according to a specific hash function. In addition, the challenge and response method is a method that generates the OTP by using the number of attempt times as the operation condition. By the method, in the OTP, a value acquired by multiplying the determined specific OTP generation key by the number of attempt times as the operation condition may be generated as the value encrypted according to the specific hash function. Therefore, by the time OTP method, a new OTP value is generated whenever a valid time (e.g., 60 seconds) of the corresponding OTP value elapses. On the contrary, by the challenge and response method, when the number of attempt times is identical, the same OTP value will be maintained regardless of the time. In the accompanying drawings of the present specification, it is illustrated that a time OTP (see T_OTP of FIG. 7) is used as the device authentication value.

Further, in this case, the authentication server 300 and the IoT device 100 may share some of key values or seed values for generating the device authentication OTP with each other in advance. For example, when the device authentication OTP is generated, a specific key value or a seed value may be shared with each other in advance in response to an ID (that is, Things_ID of FIG. 17) of the corresponding IoT device. For the reasons described above, the device authentication value generated by the authentication server 300 according to step S1112 of FIG. 17 (which is referred to as a device authentication value for verification in the present specification) becomes the same value as the device authentication value generated by the IoT device 100.

Further, in the exemplary embodiment of the present invention, the beacon message transmitted by the IoT device 100 may be limitedly transmitted with predetermined transmission intensity. Accordingly, distance limitation (hereinafter, referred to as reception distance limitation) may be applied so that the beacon message may be received from the mobile device only when the distance between the corresponding IoT device 100 and the mobile device on which the user application 200 is installed is within a specific distance (for example, a radius of 1 M, etc.). Further, in the case of the present invention, operation distance limitation may be applied so that the corresponding authentication operation may be performed only when the distance between the IoT device and the mobile device is within a beacon frequency area so that the corresponding authentication operation may be performed (for example, distance limitation may be applied so that the authentication is operated when the distance is within 3 cm). The distance limitation for such an authentication operation may be implemented as follows in an actual implementation structure. For example, the fact that the distance between the IoT device and the mobile device is within 3 cm may be checked by measuring the reception intensity or sensitivity of the beacon message received from the mobile device. Accordingly, according to the exemplary embodiment of the present invention, when the reception intensity or sensitivity of the beacon message received in the mobile device falls within a predetermined range (or when the reception intensity and the sensitivity are maximized to meet a predetermined criterion The authentication request message can be transmitted to the authentication server 300 according to step S1110 of FIG. 17.

As described above, when the user drives the user application 200 which is installed on the mobile device of the user (see S1102 of FIG. 17), the IoT device 100 may receive the beacon message which is transmitted at the corresponding time. In FIG. 17, a case where the customer directly drives the application is illustrated, but of course, the application may be implemented to be automatically driven by receiving the beacon message when the customer enters a predetermined distance range (in this case, the predetermined distance range may be a distance corresponding to the aforementioned reception distance limitation).

According to the exemplary embodiment of the present invention, when the user application 200 is driven, the user application 200 may perform user authentication for the user of the corresponding application (see S1104 of FIG. 17). When the user authentication of the user application 200 is completed, the authenticated user may select various commands or/and options through a service-available application screen in relation to the corresponding IoT device 100 (see S1106 of FIG. 17). For example, if the corresponding service is associated with mobile payment, the service may be a selection of a product to be paid (corresponding to the option) and a payment request (corresponding to the above command), and if the service is associated with opening and closing of the door, the service may be an entrance request (corresponding to the command). However, of course, there may be a case where it is unnecessary for the user to select a separate command or option according to the service. However, according to a type of application and/or the service attribute, the command and the option may be automatically selected according to the service attribute provided by the user application 200 regardless of selection of the user, and at least one of the command and the option may be unnecessary.

As described above, when the beacon message is received from the IoT device 100 (that is, when the device identification value and the device authentication value are received), the user application 200 transmits an identification value for identification of the application user, a user authentication value, a received device identification value, a received device authentication value, and the command or/and option information to the authentication server 300 (see S1108 and S1110 of FIG. 17).

In FIG. 17, a user ID (see User_ID in FIG. 17) is exemplified as the application user identification value, and a user token (see User_Token in FIG. 17) or a user OTP (see User_OTP in FIG. 17) is exemplified as the user authentication value. However, as the user identification value and the user authentication value, various values may be used in addition to the values. For example, in addition to the user ID in the example, a mobile device identification value, a mobile device number, a USIM value, an application ID, and the like may be used as the user identification value. In addition, the user token illustrated in FIG. 17 may be used for covering both the user identification value and the user authentication value, and in this case, only the user token value may be included in the authentication request message in step S1110 of FIG. 17. However, in the present specification, for convenience and concentration of description, as illustrated in FIG. 17, the user token obtained in the application user authentication process according to step S1104 of FIG. 17 is replaced with the user authentication value, but a case where the user identification value is separately included in the authentication request message to be transmitted to the authentication server 300 will be mainly described.

As described above, when the authentication request message is transmitted to the authentication server 300, the authentication server 300 generates authentication values for verification (that is, a device authentication value for verification and a user authentication value for verification) corresponding to each identification value based on the device identification value and the user identification value which are inserted in the authentication request message. The authentication server 300 may the verification of the authentication values by comparing whether the generated authentication values for verification coincide with the received device authentication value and user authentication value (see S1112 in FIG. 17), and accordingly, the authenticity of the IoT device and the user may be determined.

As the determined result of the authenticity, when it is determined that the IoT device and the user are authentic subjects that are not forged, the authentication server 300 transmits a command message including an execution command and/or an option which is inserted and loaded together with the authentication request message (see S1116 and S1118 in FIG. 17), and thus, the corresponding command may be executed (see S1120 in FIG. 17).

In the case of S1120 of FIG. 17, a case where the execution subject of the corresponding command is the IoT device 100 itself is exemplified, but of course, the execution subject of the corresponding command may be different in some cases. For example, in the door opening and closing service, the actual execution subject may exist when a door opening and closing terminal (not illustrated) and an IoT device are installed separately from each other. In this case, the authentication server 300 may transmit the corresponding command message to the door opening and closing terminal other than the IoT device. Alternatively, in some cases, a command message may be transmitted to a management server (not illustrated) that controls the door opening and closing terminal. Similarly, when the command requested by the user through the user application 200 is to pay the money of the product purchase amount to a product seller, the authentication server 300 may also transmit the command message so that an electronic payment server (not illustrated) transfer the product purchase amount from a user's account to a seller's account.

At this time, the subject receiving the command may receive the authentication value for authentication of the authentication server together with the command to check whether the sender of the command message is a valid authentication server, and may execute the command after verifying the authentication value.

Also, according to the exemplary embodiment of the present invention, when the user authentication is completed through the authentication information for verification, it is first checked whether the corresponding user who is authenticated has authority corresponding to the execution command, and then, it may be determined whether the command message is generated according to the authority checked result.

The authentication method for the mobile payment system according to the exemplary embodiment of the present invention may be implemented as a computer readable code in a computer readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

The present invention has been described with reference to the exemplary embodiments. However, it will be able to be easily appreciated by those skilled in the art that various modifications and changes of the present disclosure can be made without departing from the spirit and the scope of the present disclosure which are defined in the appended claims and their equivalents.

What is claimed is:

1. An authentication system comprising:
    a device authentication agent installed in an Internet of things (IoT) device with a communication module and generating first device authentication information for authenticating the corresponding IoT device;
    an authentication server connected with the IoT device through wired or wireless communication and generating second device authentication information for authenticating the IoT device; and
    a mobile agent installed in a mobile device of a user, connected with the IoT device and the authentication server through the wireless communication, and verifying whether the IoT device or a message determined to be received from the IoT device is authentic according to whether the first device authentication information transmitted from the IoT device and the second device authentication information transmitted from the authentication server coincide with each other.

2. The authentication system of claim 1, wherein the authentication server generates seed information for generating device authentication information, transmits the seed information to the device authentication agent, and generates the second device authentication information by using the seed information and a predesignated algorithm, and
    the device authentication agent generates the first device authentication information by using the seed information received from the authentication server and the predesignated algorithm.

3. The authentication system of claim 1, wherein the device authentication agent generates the seed information for generating the device authentication information, transmits the seed information to the authentication server, and generates the first device authentication information by using the seed information and the predesignated algorithm, and
    the authentication server generates the second device authentication information by using the seed information received from the device authentication agent and the predesignated algorithm.

4. The authentication system of claim 1, wherein the mobile agent generates the seed information for generating the device authentication information and transmits the generated seed information to the authentication server,
    the authentication server generates the second device authentication information by using the seed information received from the mobile agent and the predesignated algorithm and transmits the received seed information to the device authentication agent, and
    the device authentication agent generates the first device authentication information by using the seed information received from the authentication server and the predesignated algorithm.

5. The authentication system of claim 1, wherein the communication module is a beacon communication module, and
    the device authentication agent inserts identification information usable for identifying the corresponding IoT device and the first device authentication information into a beacon message and wirelessly broadcasts the beacon message.

6. The authentication system of claim 5, wherein the first device authentication information is inserted into at least one of a major field and a minor field which follow a data field area in which a UUID as a beacon unique value is inserted into the beacon message.

7. The authentication system of claim 6, wherein when the first device authentication information exceeds the size of the data field area into which the first device authentication information is to be inserted, the first device authentication information is converted into a value which does not exceed the size of the corresponding data field area and inserted into the beacon message.

8. The authentication system of claim 1, wherein the communication module is a near-field communication (NFC) communication module, and
    the device authentication agent transmits the first device authentication information to the mobile agent as a communication session with the mobile agent is activated through NFC handshake.

9. The authentication system of claim 1, wherein when the first device authentication information and the second device authentication information are generated by a time one time password (OTP) method using a time as an operation condition,
    the authentication server transmits both this-time second device authentication information generated at this time and previous-time second device authentication information generated at the previous time to the mobile agent, and
    the mobile agent determines whether the first device authentication information coincides with any one of the this-time second device authentication information and the previous-time second device authentication information to verify whether the IoT device is authentic.

10. The authentication system of claim 1, wherein the device authentication agent transmits the first device authentication information to the authentication server, and
the authentication server reverifies whether the IoT device is authentic according to whether the first device authentication information received from the device authentication agent and autonomously generated second device authentication information coincide with each other.

11. The authentication system of claim 1, wherein the mobile agent generates first user authentication information for authenticating a user according to the predesignated algorithm and transmits user identification information usable for identifying the corresponding user and the first user authentication information to the authentication server, and
the authentication server autonomously generates second user authentication information according to the predesignated algorithm to correspond to the user identification information received from the mobile agent, verifies whether the corresponding user is authentic according to whether the received first user authentication information and the autonomously generated second user authentication information coincide with each other, and transmits a verification result regarding whether the corresponding user is authentic to the device authentication agent.

12. The authentication system of claim 11, wherein the authentication server generates first server verification information by using the user authentication information for the user authentication and a predesignated algorithm and transmits the first server verification information and the user authentication information to the device authentication agent, and
the device authentication agent generates second server verification information by using the user authentication information received from the authentication server and the predesignated algorithm and verifies whether the authentication server is authentic according to whether the first server verification information received from the authentication server and the second server verification information coincide with each other.

* * * * *